United States Patent
Kang et al.

(10) Patent No.: US 12,389,286 B2
(45) Date of Patent: Aug. 12, 2025

(54) APPARATUS AND METHOD FOR SWITCHING COMMUNICATION INTERFACE IN WIRELESS COMMUNICATION SYSTEM

(71) Applicant: Samsung Electronics Co., Ltd., Gyeonggi-do (KR)

(72) Inventors: Minho Kang, Gyeonggi-do (KR); Chounjong Nam, Gyeonggi-do (KR); Junhak Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 17/861,357

(22) Filed: Jul. 11, 2022

(65) Prior Publication Data

US 2022/0345966 A1 Oct. 27, 2022

Related U.S. Application Data

(63) Continuation of application No. PCT/KR2021/010264, filed on Aug. 4, 2021.

(30) Foreign Application Priority Data

Aug. 4, 2020 (KR) .................. 10-2020-0097524

(51) Int. Cl.
*H04W 36/00* (2009.01)
*H04W 76/10* (2018.01)
(Continued)

(52) U.S. Cl.
CPC ....... *H04W 36/0058* (2018.08); *H04W 76/10* (2018.02); *H04W 36/302* (2023.05); *H04W 36/362* (2023.05)

(58) Field of Classification Search
CPC ............. H04W 36/0058; H04W 76/10; H04W 36/302; H04W 36/362; H04W 48/20;
(Continued)

(56) References Cited

U.S. PATENT DOCUMENTS

| 9,008,045 B2 | 4/2015 | Srivastava et al. |
| 10,206,154 B2 | 2/2019 | Ganesan |

(Continued)

FOREIGN PATENT DOCUMENTS

| CN | 103079286 A | 5/2013 |
| EP | 2946594 B1 | 11/2015 |

(Continued)

OTHER PUBLICATIONS

European Search Report dated Nov. 22, 2023.

*Primary Examiner* — Kwang B Yao
*Assistant Examiner* — Syed M Bokhari
(74) *Attorney, Agent, or Firm* — Cha & Reiter, LLC

(57) ABSTRACT

According to an embodiment of the disclosure, an operating method of an electronic device in a wireless communication system includes: establishing a wireless communication connection for transmitting and receiving data to and from an access point in a first communication method; receiving a state detection message from the access point; identifying an internal state of the electronic device in response to the state detection message being received; and determining whether to switch a communication interface, based on the identified internal state, and the internal state includes a received signal strength indicator (RSSI) value of the wireless communication connection, information regarding whether a network switching mode of the electronic device is enabled, information regarding whether an application related to the data is enabled, and/or information regarding use of the data.

18 Claims, 10 Drawing Sheets

(51) Int. Cl.
*H04W 36/30* (2009.01)
*H04W 36/36* (2009.01)

(58) Field of Classification Search
CPC ..... H04W 76/30; H04W 84/12; H04W 88/06; H04W 48/16; H04L 43/0817; H04L 43/0876; H04L 43/16; H04L 43/065
USPC ........................................................ 370/331
See application file for complete search history.

(56) References Cited

U.S. PATENT DOCUMENTS

| | | |
|---|---|---|
| 2005/0255847 A1 | 11/2005 | Han et al. |
| 2012/0163344 A1 | 6/2012 | Bakthavathsalu et al. |
| 2012/0208540 A1* | 8/2012 | Kim .................. H04W 36/0094 455/436 |
| 2015/0131460 A1* | 5/2015 | Sridhara ................ H04W 48/20 370/252 |
| 2015/0289183 A1* | 10/2015 | Iimori .................. H04W 36/302 370/331 |
| 2016/0020890 A1* | 1/2016 | Sirotkin ................ H04W 76/22 370/352 |
| 2016/0360489 A1* | 12/2016 | Boodannavar ....... H04B 7/0413 |
| 2016/0373989 A1 | 12/2016 | Tinnakornsrisuphap et al. |
| 2019/0090171 A1 | 3/2019 | Yoon et al. |
| 2019/0166524 A1 | 5/2019 | Mohamed et al. |
| 2020/0077324 A1 | 3/2020 | Choi et al. |
| 2021/0204175 A1* | 7/2021 | Rangaraju ........... H04W 12/037 |

FOREIGN PATENT DOCUMENTS

| | | |
|---|---|---|
| KR | 10-0643766 B1 | 11/2006 |
| KR | 10-1594875 B1 | 2/2016 |
| KR | 10-2019-0007104 A | 1/2019 |
| KR | 10-2023402 B1 | 9/2019 |

* cited by examiner

APPARATUS AND METHOD FOR SWITCHING COMMUNICATION INTERFACE IN WIRELESS COMMUNICATION SYSTEM

CROSS-REFERENCE TO RELATED APPLICATION(S)

This application is continuation of International Application No. PCT/KR2021/010264 filed on Aug. 4, 2021, which claims priority to Korean Patent Application No. 10-2020-0097524, filed on Aug. 4, 2020, in the Korean Intellectual Property Office, the disclosure of which is herein incorporated by reference in its entirety.

BACKGROUND

Field the present disclosure relates generally to a wireless communication system, and for example, to an apparatus and a method for switching a communication interface.

Description of Related Art

Various services and functions provided through an electronic device, for example, a portable electronic device such as a smart phone, are gradually increasing. The electronic device may exchange data with another electronic device through a wireless network. For example, the wireless network may include cellular communication done via a base station or a wireless local area network (WLAN) (or Wi-Fi communication) configured using an access point (AP). In the electronic device connected to the access point and the wireless network, the state (e.g., communication quality) of the wireless network may change as the electronic device moves.

SUMMARY

When an electronic device with an established wireless connection with an access point (AP) moves and gets out of coverage of the access point, the electronic device should determine whether to discover another access point or whether to switch its wireless communication interface to cellular communication, and may have a problem where the quality of the wireless communication service that the user receives is degraded due to time delay caused during that process.

According to an aspect of the disclosure, an operating method of an electronic device in a wireless communication system may include: establishing a wireless communication connection for transmitting and receiving data to and from an access point in a first communication method; receiving a state detection message from the access point; identifying a communication state of the electronic device in response to the state detection message being received; and determining whether to switch a communication interface, based on the identified communication state, and the communication state may include a received signal strength indicator (RSSI) value of the wireless communication connection, information regarding whether a network switching mode of the electronic device is enabled, or information regarding whether an application related to the data is enabled.

According to an aspect of the disclosure, an apparatus of an electronic device may include: a communication unit; and at least one controller electrically connected with the communication unit, and the at least one controller may be configured to: establish a wireless communication connection for transmitting and receiving data to and from an access point in a first communication method; receive a state detection message from the access point; identify a communication state of the electronic device in response to the state detection message being received; and determine whether to switch a communication interface, based on the identified communication state, and the communication state may include at least one of a received signal strength indicator (RSSI) value of the wireless communication connection, information regarding whether a network switching mode of the electronic device is enabled, or information regarding whether an application related to the data is enabled.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
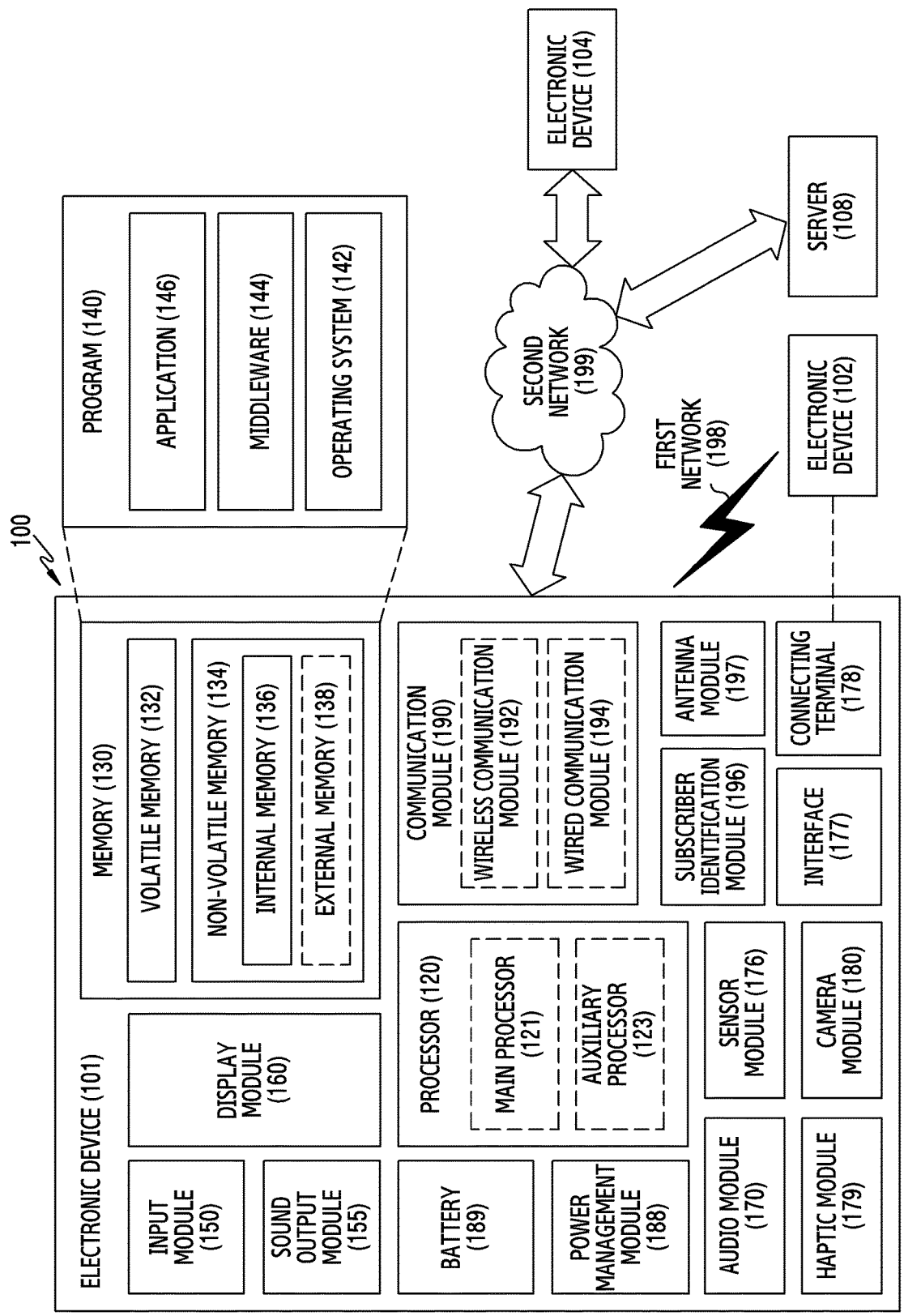
FIG. 1 illustrates a block diagram of an electronic device in a network environment according to an embodiment of the disclosure.

Based on the above-described discussion, certain embodiments of the disclosure may provide an apparatus and a method for switching communication networks based on the communication quality between the electronic device and the access point in a wireless communication system.

Terms used in the present disclosure are used only to describe specific embodiments, and may not be intended to limit the scope of other embodiments. The singular expression may include the plural expression unless the context clearly dictates otherwise. Terms used herein, including technical or scientific terms, may have the same meanings as commonly understood by one of ordinary skill in the art described in the present disclosure. Terms defined in a general dictionary among terms used in the present disclosure may be interpreted as having the same or similar meaning as the meaning in the context of the related art, and unless explicitly defined in the present disclosure, not interpreted as ideal or excessively formal meanings. In some cases, even terms defined in the present disclosure cannot be construed to exclude embodiments of the present disclosure. In various embodiments of the present disclosure described below, a hardware access method will be described as an example. However, since various embodiments of the present disclosure include technology using both hardware and software, various embodiments of the present disclosure do not exclude a software-based approach.

Hereinafter, the instant disclosure generally describes techniques for reducing a delay experienced by the user by reducing time required to switch a communication network in a wireless communication system, through an apparatus and a method for switching the communication network based on communication quality between an electronic device and an access point in the wireless communication system.

In the following description, a physical channel and a signal may be used interchangeably with data or a control signal. For example, a physical downlink shared channel (PDSCH) is a term that refers to a physical channel through which data is transmitted, but the PDSCH may also be used to refer to data. That is, in the present disclosure, an expression "transmitting a physical channel" may be interpreted equivalently to an expression "transmitting data or a signal through a physical channel." Hereinafter, in the present disclosure, higher signaling may refer to a signal transmission method in which data from a base station is transmitted to an electronic device using a downlink data channel of a physical layer or from an electronic device to the base station using an uplink data channel of a physical layer. Upper signaling may be understood as radio resource control (RRC) signaling or media access control (MAC) control element (CE). In addition, various embodiments of the present disclosure describe various embodiments using terms used in some communication standards (e.g., 3rd generation partnership project (3GPP)), but this is only an example for description. Various embodiments of the present disclosure may be easily modified and applied in other communication systems.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 may provide an ultra-low latency service using, for example, distributed computing or mobile edge computing. In another embodiment, the external electronic device 104 may include an Internet of things (IoT) device. The server 108 may be an intelligent server using machine learning and/or neural networks. According to an embodiment, the external electronic device 104 or the server 108 may be included in the second network 199. The electronic device 101 may be applied to an intelligent service (e.g., smart home, smart city, smart car, or health care) based on 5G communication technology and IoT-related technology.

Figure 2:
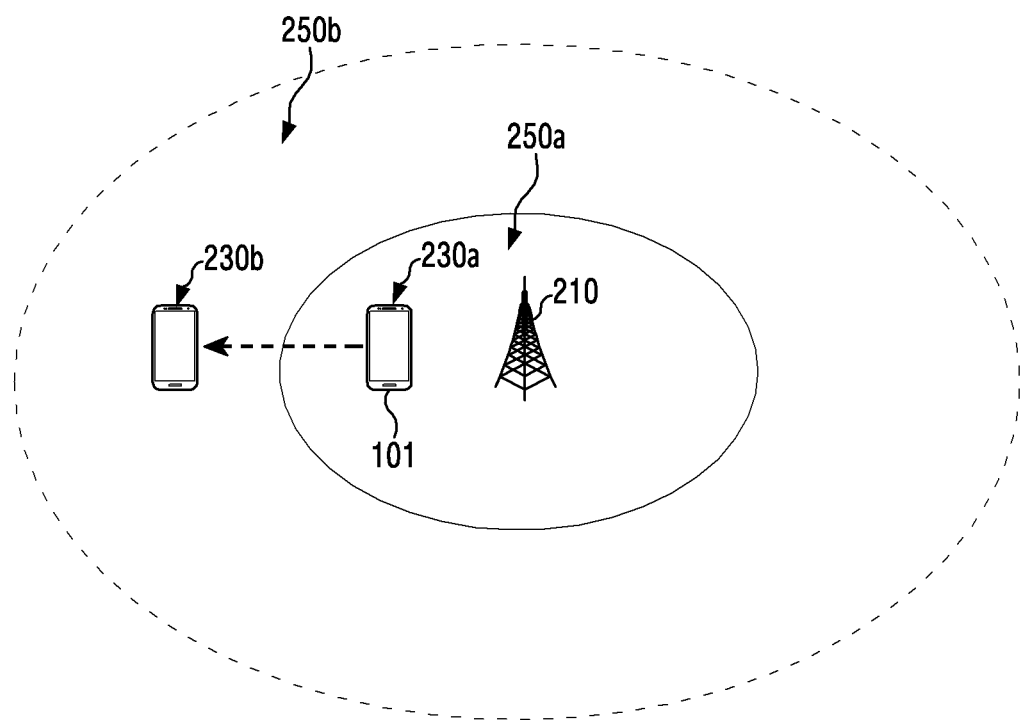
FIG. 2 illustrates a communication interface switching process in a wireless communication system according to an embodiment of the disclosure.

FIG. 2 illustrates a communication interface switching process in a wireless communication system according to an embodiment of the disclosure.

Referring to FIG. 2, in certain embodiments of the disclosure, the apparatus or method for switching a communication interface in a wireless communication system may be configured based on a relationship between the electronic device (for example, the electronic device 101 of FIG. 1) and the access point 210. The access point 210 may form a network for providing a wireless communication service to the electronic device. The access point 210 may communicate with the electronic device 101 in a predetermined region (for example, a coverage area) formed with reference to the access point 210. Communication between the access point 210 and the electronic device 101 may be achieved by transmitting and receiving signals or data, and may be performed through at least one communication interface (for example, the communication module 190 of FIG. 1). The access point 210 may be related to one communication interface. According to certain embodiments, the communication interface may include a short-range communication network (for example, Bluetooth, wireless fidelity (Wi-Fi) direct or infrared data association (IrDA)), and a cellular communication network (for example, a legacy cellular network, 5G network, next-generation communication network). The communication interface according to an embodiment may be understood as meaning all interfaces for transmitting and receiving data or signals. For example, changing the communication interface may refer to changing one of the short-range communication network and/or the cellular communication network to the other one while the electronic device 101 is performing communication with an external electronic device (for example, the electronic device 102, the electronic device 104, or the server 108 of FIG. 1) using one of the short-range communication network and/or the cellular communication network. The access point 210 shown in FIG. 2 may be an access point 210 that provides the Wi-Fi network. In this case, the access point 210 may be understood as a device providing Wi-Fi. In addition, a first radius 250*a* formed with reference to the corresponding access point 210 may indicate the region where the access point 210 can smoothly provide a wireless communication service. For example, the first radius 250*a* formed with reference to the access point 210 may be set based on the signal strength or the transmission speed set at the access point 210 and/or the electronic device 101. According to an embodiment, when the electronic device 101 is located within the first radius 250*a*, the distance between the access point 210 and the electronic device 101 may be variable. For example, the distance between the access point 210 and the electronic device 101 may vary according to the position and/or performance of an antenna of the access point 210 and/or the electronic device 101.

The first radius 250*a* formed with reference to the corresponding access point 210 may indicate a service region of the access point 210. The access point 210 forming the service region may form a communication network with at least one electronic device (for example, the electronic device 101) existing within the service region, and may transmit and receive data to and from the electronic device. The service region may be understood as a certain region where wireless communication between the access point 210 and the electronic device 101 is smoothly performed. Accordingly, when the electronic device 101 is out of the service region, wireless communication such as transmission and reception of data, or communication efficiency may be degraded. That is, the region defined by the first radius 250*a* may be where wireless communication between the electronic device 101 and the access point 210 is smoothly performed, and the region defined by a second radius 250*b* may be where the electronic device 101 is out of the service region, and communication efficiency is degraded and smooth wireless communication is not performed. A predetermined threshold value may determine the first radius. When the electronic device 101 receives a signal greater than or equal to a threshold value from the access point 210, a region where the corresponding electronic device 101 is located may be a region within the first radius 250*a*, that is, the service region. In addition, when the electronic device 101 receives a signal less than the threshold value from the access point 210, a region where the corresponding electronic device 101 is located may be a region that is out of the first radius 250*a* and within the second radius 250*b*. At least one electronic device (for example, the electronic device 101) may exist within the service region, and the at least one electronic device (for example, the electronic device 101) may perform wireless communication with the access point 210 while existing in the service region. For example, the access point 210 and electronic devices (for example, the electronic device 101) existing within the service region may constitute a wireless communication system. In an embodiment, at least one electronic device (for example, the electronic device 101) may be installed to be fixed within the service region, or may move in or out of the service region. In another example, at least one (for example, the electronic device 101) of a plurality of electronic devices may move randomly according to user's intent, behavior pattern or an environment, and this operation may be performed within a range that is not predictable by the access point 210. Communication quality of at least one electronic device (for example, the electronic device 101) existing within the service region may vary according to a distance from the access point 210. When the electronic device (for example, the electronic device 101) is located at a position 230a close to the access point 210, the access point 210 may provide a wireless communication service of good quality, and, when the electronic device (for example, the electronic device 101) is located at a position 230b far from the access point 210, the access point 210 may provide a wireless communication service of poor quality. The close position 230a and the far position 230b may be physical positions, and there may be threshold values for determining these positions. There may be a difference in wireless communication quality according to the physical position between the electronic device (for example, the electronic device 101) and the access point 210, but it may be assumed that at least one electronic device (for example, the electronic device 101) existing within the service region is located at a distance corresponding to smooth wireless communication service. For example, the electronic device (for example, the electronic device 101) existing within the service region may communicate with the access point 210 with a signal greater than or equal to a designated threshold value or at a speed higher than or equal to a designated threshold value. When the electronic device 101 moves due to an external factor, gets out of the service region, and is located in another region (for example, a region larger than or equal to the first radius 250a and within the second radius 250b larger than the first radius 250a), quality of a wireless communication service performed between the electronic device 101 and the access point 210 may be lower than quality of the wireless communication service performed between the electronic device 101 and the access point 210 within the service region. In addition, as the electronic device approaches the boundary of the service region, smooth communication between the electronic device 101 and the access point 210 may become difficult even if the electronic device 101 is not out of the service region. Smooth communication between the electronic device 101 and the access point 210 becoming difficult may refer to a state in which the access point 210 does not transmit a sufficient quantity of data requested by the electronic device 101 for a given time period.

Whether smooth communication service is possible may be determined based on a pre-set threshold value. When the quantity of data transmitted and received between the electronic device 101 and the access point 210 does not reach the pre-defined threshold value, the electronic device 101 or the access point 210 may determine that smooth wireless communication service is not provided. In this case, the threshold value may be set differently according to the type of wireless communication service and/or application. For example, in the case of a high-quality media streaming service, the threshold value may be set to be higher than that in the case for text messaging or photo transmission service.

When it is determined that it is difficult to provide smooth wireless communication service in the electronic device 101 or the access point 210, the electronic device 101 may discover another access point according to its own determination or by referring to information received from the access point 210. The process of discovering another access point may be performed when the electronic device 101 exists within the service region but approaches the boundary of the service region, or when the electronic device 101 is out of the service region. The electronic device 101 out of the service region may discover another access point that provides service in the region 250b. On the assumption that the access point 210 provides Wi-Fi communication, the process of discovering another access point may be performed through an operation of scanning another access point. The electronic device 101 out of the service region may identify the number of other neighboring access points, positions, identification information, and/or signal strength, by performing the discovering process (for example, the operation of scanning). According to an embodiment, even when the electronic device 101 is out of the service region of the access point 210, the electronic device 101 may maintain the connection with the access point 210. In this case, the electronic device 101 may transmit information acquired through the discovering process to the access point 210. Since the electronic device 101 may not exactly know whether another connectable access point is, the access point 210 may receive the information acquired by the electronic device 101 through the discovering process from the electronic device 101, and may confirm whether another access point can be connected with the electronic device 101. After the confirmation process, the access point 210 may recommend another access point that can provide better wireless communication service to the electronic device 101. The recommendation may be included a request message transmitted to the electronic device 101.

Figure 3:
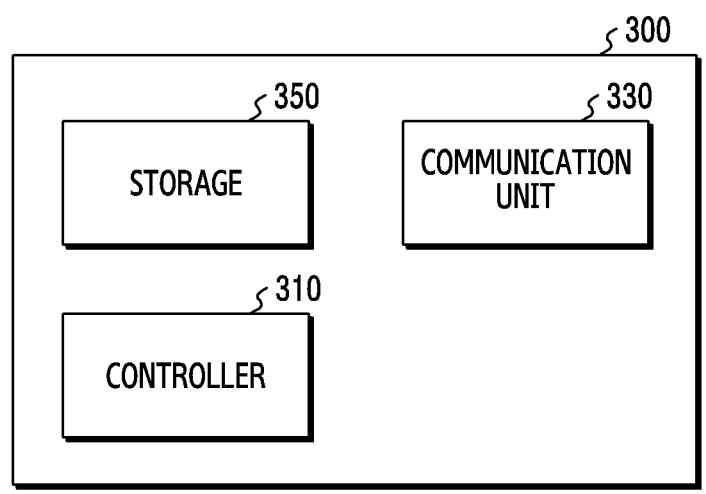
FIG. 3 illustrates a configuration of an electronic device in a wireless communication system according to an embodiment of the disclosure.

FIG. 3 illustrates a configuration of an electronic device in a wireless communication system according to an embodiment of the disclosure. The configuration illustrated in FIG. 3 may be understood as a configuration of an electronic device 300. The term "unit" or certain terms ending with suffixes "-er," and "-or" used in the following description refer to a unit processing at least one function or operation, and may be implemented by hardware, software, or a combination of hardware and software. The electronic device 101 of FIG. 1, the electronic device 101 of FIG. 2, and the electronic device 300 of FIG. 3 may perform the same or similar functions.

Referring to FIG. 3, the electronic device 300 may include a controller 310 (for example, the processor 120 of FIG. 1), a communication unit 330 (for example, the communication module 190 of FIG. 1), a storage 350 (for example, the memory 130 of FIG. 1). The communication unit 330 may perform functions for transmitting and receiving signals via a wireless channel. For example, the communication unit 330 may perform the function of converting between a baseband signal and a bit stream according to the physical layer standard of the system. For example, when transmitting data, the communication unit 330 may generate complex symbols by encoding and modulating a transmission bit stream. In addition, when receiving data, the communication unit 330 may restore a reception bit stream by demodulating and decoding a baseband signal. In addition, the communication unit 330 may up-convert a baseband signal into a radio frequency (RF) band signal, and then may transmit the signal via an antenna, and may down-convert an RF band signal received via an antenna into a baseband signal. For example, the communication unit 330 may include a transmission filter, a reception filter, an amplifier, a mixer, an oscillator, a digital-to-analogue converter (DAC), and/or an analogue-to-digital converter (ADC).

In addition, the communication unit 330 may include a plurality of transmission and reception paths. Furthermore, the communication unit 330 may include at least one antenna array including a plurality of antenna elements. As far as hardware is concerned, the communication unit 330 may include a digital circuit and an analog circuit (for example, a radio frequency integrated circuit (RFIC)). Herein, the digital circuit and the analogue circuit may be implemented as a single package. In addition, the communication unit 330 may include a plurality of RF chains. Furthermore, the communication unit 330 may perform beamforming.

In addition, the communication unit 330 may include different communication modules to process signals of different frequency bands. Furthermore, the communication unit 330 may include a plurality of communication modules to support a plurality of different wireless access technologies. For example, the different wireless access technologies may include Bluetooth low energy (BLE), wireless fidelity (Wi-Fi), Wi-Fi Gigabyte (WiGig), a cellular network (for example, long term evolution (LTE)). In addition, the different frequency bands may include a super high frequency (SHF) (for example, 2.5 GHz, 5 GHz, or 6 GHz) band, or a millimeter (mm) wave (for example, 60 GHz) band.

The communication unit 330 may transmit and receive signals as described above. Accordingly, the entirety or a portion of the communication unit 510 may be referred to as a "transmitter," "receiver," or "transceiver." In addition, in the following description, transmitting and receiving via a wireless channel may mean processing by the communication unit 330 as described above.

The storage 350 may store data such as a basic program for the operation of the electronic device 300 (e.g. an operating system), an application program, configuration information, etc. The storage 350 may be a volatile memory, a nonvolatile memory, or a combination of a volatile memory and a nonvolatile memory. In addition, the storage 350 may provide stored data according to a request of the controller 310.

The controller 310 may control overall operations of the electronic device 300. For example, the controller 310 may transmit and receive signals via the communication unit 330. In addition, the controller 310 may write and read out data on or from the storage 350. In addition, the controller 310 may perform functions of a protocol stack required by communication standards. To achieve this, the controller 310 may include at least one processor or microprocessor, or may be a portion of a processor. In addition, a portion of the communication unit 310 and the controller 310 may be referred to as a communication processor (CP). According to certain embodiments, the controller 310 may be included a band sharing system and may transmit control commands to respective devices constituting the band sharing system. Herein, the control command may be an instruction set or a code stored in the storage 350, and may be an instruction/code at least temporarily resided in the controller 310, or a storage space storing an instruction/code, or may be a portion of a circuitry constituting the controller 310. The controller 310 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to certain embodiments, the controller 310 may continuously measure the received signal strength of an access point (for example, the access point 210 of FIG. 2), which is currently connected with the electronic device 300, may determine whether to discover another access point by determining whether the electronic device 300 will be out of the service region, and accordingly, may determine whether to move to a Wi-Fi network of another access point or whether to change the communication interface to cellular communication, and may control to perform these operations.

In addition, the controller 310 of the electronic device 300 may include a determination unit and an operation unit.

According to an embodiment, the determination unit may determine which operation the controller 310 will perform, based on information received through the communication unit 330. For example, the determination unit may determine which operation the controller 310 will perform, based on information stored in the storage 350. According to an embodiment, the determination unit may determine whether an application processor (AP) is in a sleep (or suspend) state. The determination unit may determine whether an application installed in the electronic device 300 is executed.

According to an embodiment, the determination unit may determine whether the application processor is in the sleep state. When the application processor is in the sleep state, an application related to wireless communication (for example, data transmission and reception) of the access point 210 may be disabled. When the application is disabled, it may be understood that the corresponding application is not executed or is executed in the background. For example, when the user executes another operation in the middle of transmitting and receiving data through an application for wireless communication, the determination unit may determine whether the application for wireless communication is executed in the background. That is, when the application processor is in the sleep state, it may be understood that an application related to wireless communication is not executed or is executed in the background.

According to an embodiment, the determination unit may determine whether an application installed in the electronic device 300 is used. Even when the installed application is used in the background, the determination unit may determine whether the user is not currently using the application, for example, when the display is turned off. Accordingly, the determination unit may determine whether an application related to transmission and reception of wireless data is used by the user. For example, the determination unit may identify whether an application for providing voice and/or video streaming service or cloud-based service (for example, a cloud game) is used in real time. In the case of a real-time video streaming service, the determination unit may determine that a corresponding application is not used when the screen is turned off. In the case of a voice streaming service, the determination unit may determine that a corresponding application is not used when a speaker is in a mute state.

The determination unit may determine whether an application is in a sleep mode, based on at least one of an electronic device using pattern of the user, a history of using applications, a current data transmission and reception rate, and/or a type of data.

According to an embodiment, the determination unit may identify whether data is currently used and the quantity of used data. For example, data may include data that is received from the access point and/or data that is transmitted to the access point in a state where a communication connection with the access point is maintained. For example, the quantity of used data may include the type of data or the size of data, and may expressed as a quantity of data transmitted per second, or a total quantity of data transmitted and received after the connection with the access point is set. The electronic device 300 may periodically or intermittently update the information regarding whether data is used and the quantity of used data in the storage 350.

According to an embodiment, the determination unit may identify user preference. For example, the user preference may refer to user's preference for a specific communication interface. In an environment where there exist a plurality of communication interfaces for providing wireless communication service, history data of the communication interface used may be used to determine the user preference. For example, when the electronic device 300 and the access point (for example, the access point 210 of FIG. 2) maintain Wi-Fi connection, and it is determined that quality of the Wi-Fi connection is lower than a predetermined value, the determination unit may inquire of the user about whether to switch to cellular communication or whether to maintain the existing Wi-Fi connection, and may store data regarding the communication interface preferred by the user according to a response of the user to the inquiry. According to an embodiment, in order to establish data regarding the communication interface preferred by the user, the electronic device 300 may analyze user's data consumption habit, the environment where data is used, and/or information regarding the difference of normal connection quality of the cellular communication service used by the user from the Wi-Fi communication service. For example, the environment in which data is used may be implemented as environmental information regarding whether the region where the user is positioned smoothly provides cellular communication, and/or how fast the user moves.

According to an embodiment, the electronic device 300 may periodically inquire of the user about which of Wi-Fi communication or cellular communication will be used to maintain a wireless communication connection, according to a change in the wireless communication environment, and may estimate user's preference by synthesizing data regarding user's response to the inquiry. The data regarding the user's preference may be expressed as numerical values, and may be updated in an external server (for example, the server 108 of FIG. 1) or may be stored in the storage 350 of the electronic device 300.

According to an embodiment, the determination unit may identify a cellular data plan of the user. For example, the cellular data plan may be understood as being related to the type of a cellular service that is provided by a base station so as to allow the electronic device 300 of the user to use cellular communication. When a mobile operator, which provides the cellular communication service through the base station, provides restricted cellular data to the electronic device 300, the electronic device 300 may monitor how much cellular data remains, and may store the result of monitoring in the storage 350, and may allow the result to be used for operations of the operation unit. In this case, the remaining data may be understood as a quantity of data remaining until data usage defined by the cellular data plan of the user is reached. When the user uses cellular data in excess of defined data usage, the quantity of data used thereafter may incur additional fees. Therefore, the determination unit may monitor data usage and may provide relevant information to the user, and this information may be used for determining user preference. If remaining cellular data is 0, the user may be expected to prefer Wi-Fi communication over cellular communication, which may be used as a determination factor for performing a switching operation of a communication interface.

According to an embodiment, the determination unit may identify information regarding mobility of the electronic device 300.

A network switching mode may be used to solve degradation of network quality caused by movement of the electronic device 300, and it may be determined whether the user is moving by measuring network quality. However, there may be other factors that influence network quality in addition to movement of the electronic device 300, and these factors may not be overcome by switching the communication interface. Therefore, in order to appropriately distinguish these factors and to switch a network as necessary, it may be required to identify information regarding the mobility of the electronic device 300 in real time. According to an embodiment, the electronic device 300 may identify an absolute position of the electronic device 300 or a relative position which is determined based on a relationship with an access point (for example, the access point 210 of FIG. 2), by using a sensor (for example, the sensor module 176 of FIG. 1) provided in the electronic device 300 or position information included in a signal transmitted from the electronic device 300. In this case, the sensor may use a GPS device provided in the electronic device 300.

According to an embodiment, the determination unit may identify a Wi-Fi parameter. For example, the Wi-Fi parameter may refer to a performance parameter regarding a Wi-Fi connection between the access point (for example, the access point 210 of FIG. 2) and the electronic device 300. The Wi-Fi parameter may be understood as including a parameter value regarding at least one element that may influence performance when Wi-Fi communication is used, such as a surrounding environment where the electronic device 300 is used, performance of the access point (for example, the access point 210 of FIG. 2), an installation position of the access point (for example, the access point 210 of FIG. 2), and/or the type of the communication module (for example, the communication unit 330) mounted in the electronic device 300. According to an embodiment, the determination unit may identify a plurality of parameters that may influence Wi-Fi communication, or may apply weights to various parameters.

According to an embodiment, the determination unit may identify a cellular parameter. For example, the cellular parameter may be understood as including a parameter value regarding at least one element that may influence performance when cellular communication is used, such as the type of cellular communication provided by a base station, a cellular data plan to which the user subscribes, a surrounding environment where the electronic device is used by the user, or some other metric to measure the user's experience. According to an embodiment, the determination unit may identify a plurality of parameters that may influence cellular communication, or may apply weights to various parameters.

According to an embodiment, the determination unit may determine which communication interface can result in the best performance of the electronic device 300, by comparing the Wi-Fi parameter and the cellular parameter, and may transmit information regarding the determination to the operation unit or may instruct the operation unit.

According to an embodiment, the operation unit may perform an operation based on information identified by the determination unit. For example, the operation may be disconnecting the Wi-Fi connection with the access point (for example, the access point 210 of FIG. 2) which is currently connected with the electronic device 300, and switching the communication interface to cellular communication. In another example, the operation may be performing Wi-Fi roaming to another access point which is discovered by the electronic device 300. According to an embodiment, the electronic device 300 may selectively perform the operation of performing Wi-Fi roaming to another access point which is searched nearby, or the operation of switching to cellular communication. In another example, the operation may be changing a threshold value of an application for managing a data bearer. The electronic device 300 may efficiently switch the network by adjusting the threshold value according to the surrounding environment or a situation of the user.

Figure 4:
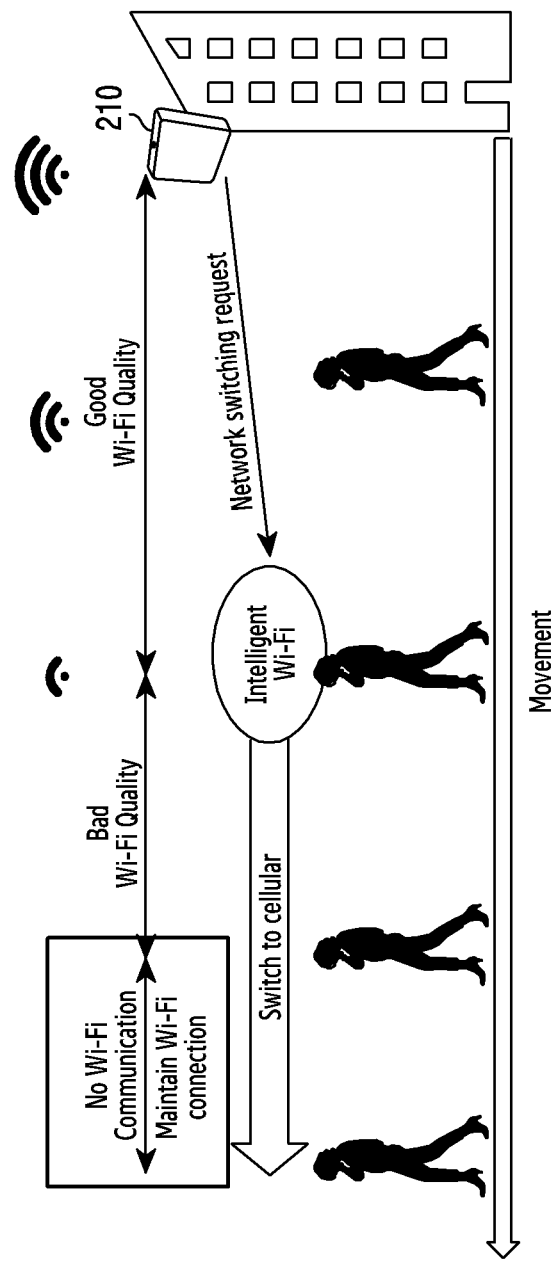
FIG. 4 illustrates switching of a communication interface in a conventional wireless communication system.

FIG. 4 illustrates switching of a communication interface in a conventional wireless communication system.

FIG. 4 discloses conventional operations done to switch the communication interface when the electronic device 101 is moving.

When the electronic device 101 of the user moves while being connected with the access point 210, which provides wireless communication service, communication quality of the electronic device 101 of the user may be changed according to the distance to the access point 210. When the electronic device 101 is out of the maximum region of the access point 210 for providing smooth wireless communication service, or approaches the boundary of the maximum region, data transmission and reception efficiency between the electronic device 101 of the user and the access point 210 may be degraded, and the electronic device 101 may determine whether to discover another access point for providing better wireless communication service, or whether to switch to cellular communication. In this case, when the connection with the existing access point is maintained in the background, time required to determine whether to switch to another access point or to cellular communication may delay wireless communication and cause user inconvenience.

When the user carrying the electronic device 101 gets out of a service region of the access point 210 currently connected with the electronic device 101, communication quality that the user experiences may be degraded. When the Wi-Fi connection between the access point 210 and the electronic device 101 becomes weaker and smooth communication is impossible, the electronic device 101 may restart the communication connection by using cellular communication rather than the Wi-Fi connection. In addition, the electronic device 101 may discover another access point existing around the electronic device 101, and, when quality of a communication connection service provided by the access point 210 found by discovering is better than quality of the communication connection service of the access point 210 currently connected, the electronic device 101 may perform roaming to the access point 210 that provides the better service quality.

When the electronic device 101 exists within a service region (for example, the service region of FIG. 2) of the access point 210, the electronic device 101 may receive Wi-Fi service of good quality. However, when the electronic device 101 gets out of the service region, connection quality of the Wi-Fi service that the electronic device 101 receives may be degraded. In this case, the electronic device 101 may switch the communication interface to cellular communication at the boundary of the service region. Switching of the communication interface may be performed upon receiving a switching request from the access point 210.

In this case, even when the electronic device 101 gets out of the service region, the Wi-Fi communication connection between the electronic device 101 and the access point 210 may not immediately be disconnected and the electronic device 101 may maintain the current connection with the access point 210 until the electronic device 101 determines to switch to the cellular communication. In this case, the connection between the access point 210 and the electronic device 101 may be maintained in the background. Accordingly, the electronic device 101 may receive low-quality Wi-Fi service from the access point 210 until the electronic device 101 determines to discover better Wi-Fi or to switch to cellular communication. In general, the electronic device 101 may start the discovering procedure when the electronic device 101 reaches the boundary of the service region, and may determine to discover better Wi-Fi or to switch the communication interface to cellular communication. But even so, for example, 6-10 seconds may be required to disconnect the Wi-Fi communication connection with the current access point 210. Accordingly, the electronic device 101 may maintain low-quality Wi-Fi connection for 6-10 seconds. In certain embodiments of the instant disclosure, processes for rapidly determining whether to disconnect the communication connection in order to reduce user inconvenience caused as described above are explained.

Figure 5:
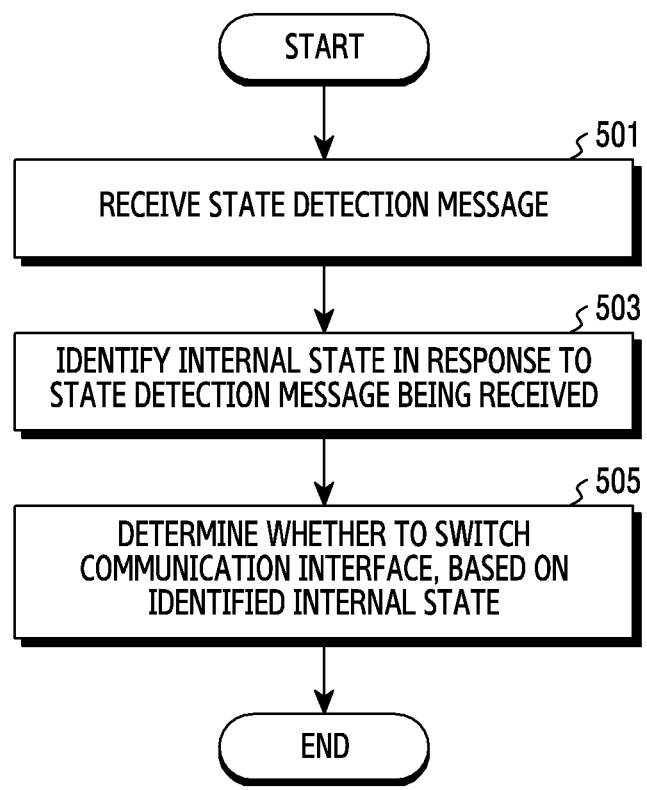
FIG. 5 illustrates a flowchart for an operation of an electronic device for switching a communication interface in a wireless communication system according to embodiments of the disclosure.

FIG. 5 is a flowchart illustrating an operation of an electronic device 101 for switching a communication interface in a wireless communication system according to an embodiment of the disclosure.

According to an embodiment, in operation 501, the electronic device 101 may receive a state detection message from the access point 210. The state detection may refer to detection of a communication state of the electronic device 101, and for example, may refer to detection regarding whether a wireless communication state between the electronic device 101 and the access point 210 changes to the extent that the communication interface needs to be switched. The state detection message may be received in the form of a switching request. The access point 210 may refer to an access point 210 that currently maintains the connection with the electronic device 101. The process of receiving the switching request may be performed when the electronic device 101 gets out of a service region (for example, the service region of FIG. 2) provided by the access point 210, or approaches the boundary of the service region. Herein, the service region provided by the access point 210 may be understood as a threshold region in which wireless communication connection is smoothly achieved between the electronic device 101 and the access point 210, and in this case, the threshold region may be associated with a volume of physical space. According to an embodiment, the access point 210 may detect the state of the electronic device 101 during a continuous communication process with the electronic device 101, or may identify that the electronic device 101 moves farther away from the access point 210 or exists in a region where a smooth service is impossible, based on information provided from the electronic device 101. According to another embodiment, the access point 210 may continuously, periodically receive information regarding movement of the electronic device 101 from the electronic device 101, and accordingly, when the electronic device 101 currently exists in the service region, but is expected to get out of the service region after a predetermined time, the access point 210 may transmit the switching request to the electronic device 101. Accordingly, when the electronic device 101 receives the switching request from the access point 210, the electronic device 101 may detect that quality of the wireless communication service has been degraded or may be degraded.

According to an embodiment, the switching request may include recommendation information that is determined by the access point 210. For example, the recommendation information may include information regarding another access point that is connectable by the electronic device 101. The connectable access point may be another access point that may provide a smooth wireless communication service to the electronic device 101, and may refer to another access point whose service region includes the current position of the electronic device 101, or whose service region includes a position to which the electronic device 101 is expected to move within a predetermined time.

According to an embodiment, the recommendation information may be determined by the access point 210 based on information provided from the electronic device 101. For example, the electronic device 101 may perform a searching operation and may transmit information regarding existence of another access point around the electronic device 101, identification information, position, or the current position of the electronic device 101 to the access point 210. The access point 210 which acquires the information may generate recommendation information according to a pre-set criterion, based on the information provided from the electronic device 101. According to an embodiment, the recommendation information may be included in the switching request message and may be transmitted. However, the message including the recommendation information is not limited to being transmitted as a switching request, and, as long as the message includes recommendation information for recommending, suggesting information on another access point to the electronic device, and information for instructing the electronic device 101 to determine whether to switch the communication interface, there is no limit to the form or method of the transmitted message.

According to an embodiment, in operation 503, the electronic device 101 may identify a communication state of the electronic device 101 in response to the state detection message being received from the access point 210. For example, the communication state may refer to an internal state of the electronic device 101, and may be understood as including a communication performance parameter of the electronic device and/or a received signal strength. In the following description, the internal state may refer to a state of internal software or hardware (whether a specific application is in a sleep mode) of the electronic device. The internal state and the communication state may be used interchangeably in the following description. For example, the process of the electronic device 101 identifying the internal state may be understood as an operation of identifying the type and the size of data transmitted and received between the electronic device 101 and the access point 210, and/or a transmission time. In another example, the process of the electronic device 101 identifying the internal state may be understood as an operation of internally identifying a connection state with the access point 210. In still another example, the process of identifying the internal state may be understood as an operation of identifying whether a processor which executes an application or a program connecting the electronic device 101 to the access point 210 is in sleep mode. In yet another example, the process of the electronic device 101 identifying the internal state may be understood as including a process of identifying whether a network switching mode is enabled in the electronic device 101.

According to an embodiment, the operation of the electronic device 101 identifying the communication state of the electronic device 101 may be started in response to the switching request being received from the access point 210. According to another embodiment, the operation of the electronic device 101 identifying the internal state may be started in response to recommendation information being received from the access point 210. However, the above-description does not limit the operation of identifying the internal state of the electronic device 101 to being determined depending on the received recommendation information. The operation of the electronic device 101 identifying the internal state of the electronic device 101 and performing a subsequent operation may be performed regardless of contents of the recommendation information transmitted from the access point 210, or may be performed by referring to the recommendation information. Herein, the acquisition of the switching request including the recommendation information by the electronic device 101 may be understood as an operation for triggering the operation of the electronic device 101 identifying the internal state.

According to an embodiment, in operation 505, the electronic device 101 may determine whether to switch a network in response to the communication state being identified. For example, the electronic device 101 may identify the internal state of the electronic device 101, and may determine whether to disconnect the connection with the access point 210, based on the identified information. In another example, the electronic device 101 may determine whether to maintain the connection with the access point 210, based on the identified information. When the electronic device 101 determines to disconnect the connection between the access point 210 and the electronic device 101, the electronic device 101 may determine whether to perform roaming to another access point or whether to switch to cellular communication, as a subsequent operation. The electronic device 101 may identify a received signal strength indication (RSSI) with the access point 210 currently connected thereto, using the internal state information of the electronic device 101. The electronic device 101 may compare the identified RSSI and a pre-defined threshold value, and may determine whether to switch the network according to the result of comparing. The pre-defined threshold value may be understood as an RSSI that enables smooth wireless communication between the access point 210 and the electronic device 101. The pre-defined threshold value may be referred to as a threshold RSSI. The threshold RSSI may be differently determined based on at least one of the type of the electronic device 101, the state of the electronic device 101 as described herein, the type of the content to be transmitted, data to be transmitted, and/or identification information of the access point 210 currently connected with the electronic device. The threshold RSSI may be a value pre-defined by the user or may be a value determined according to information received from an external device.

The electronic device 101 according to certain embodiments may identify whether an application processor of the electronic device 101 is in sleep mode, through the process of identifying the internal state of the electronic device 101. For example, the sleep mode may refer to the mode in which a processor executing a corresponding application goes into idle state in order to efficiently utilize resources. The application processor may refer to a processor that executes an application related to data transmission performed between the access point 210 and the electronic device 101. When data transmission between the electronic device 101 and the access point 210 is in the idle state, substantial data transmission may not be performed even if the electronic device 101 is out of the service region of the access point 210, and accordingly, the electronic device may maintain the connection with the currently connected access point 210 without having to discover another access point or switch into cellular communication.

The electronic device 101 according to certain embodiments may further perform a process of identifying whether a network switching mode of the electronic device 101 is enabled. For example, the network switching mode may refer to a mode in which it is possible to switch the communication interface from Wi-Fi communication to cellular communication or from cellular communication into Wi-Fi communication. When the network switching mode is enabled, the electronic device 101 may switch the communication interface according to a change in an external environment or a pre-defined criterion, and, when the corresponding mode is disabled, the communication interface may be only switched by a user input. The process of identifying whether the network switching mode is enabled may precede the process of identifying a current RSSI or identifying whether the application processor of the electronic device 101 is in sleep mode.

According to certain embodiments, the electronic device 101 may receive the switching request from the access point 210 currently connected therewith, and may identify the internal state in response to the reception. Herein, the internal state may include a connection state between the electronic device 101 and the access point 210, information regarding whether the application processor is in the sleep mode, information regarding whether the electronic device 101 supports the network switching mode or whether the network switching mode of the electronic device 101 is currently enabled. In addition, the internal state may include information regarding whether data is currently used by the user and data usage, user preference, the cellular data plan, mobility information of the electronic device, and/or a value of the result of comparing a Wi-Fi parameter and a cellular parameter. When the internal state is identified and a specific condition is satisfied, the electronic device 101 may disconnect or maintain the connection with the access point 210 currently connected therewith. When the electronic device 101 disconnects the connection with the access point 210 currently connected therewith, the electronic device 101 may perform a subsequent operation, that is, an operation of discovering another neighboring access point, and an operation of, when quality of a connection between another access point and the electronic device 101 is better than that of the current access point 210, or an RSSI greater than or equal to a pre-set threshold is identified in the connection with another access point, performing roaming to another access point. In addition, when another access point is discovered, but quality of the connection is not better than that of the current access point 210 or an RSSI less than the pre-set threshold value is identified in the connection between the electronic device 101 and another access point, the electronic device 101 may switch the communication interface to cellular communication.

Figure 6:
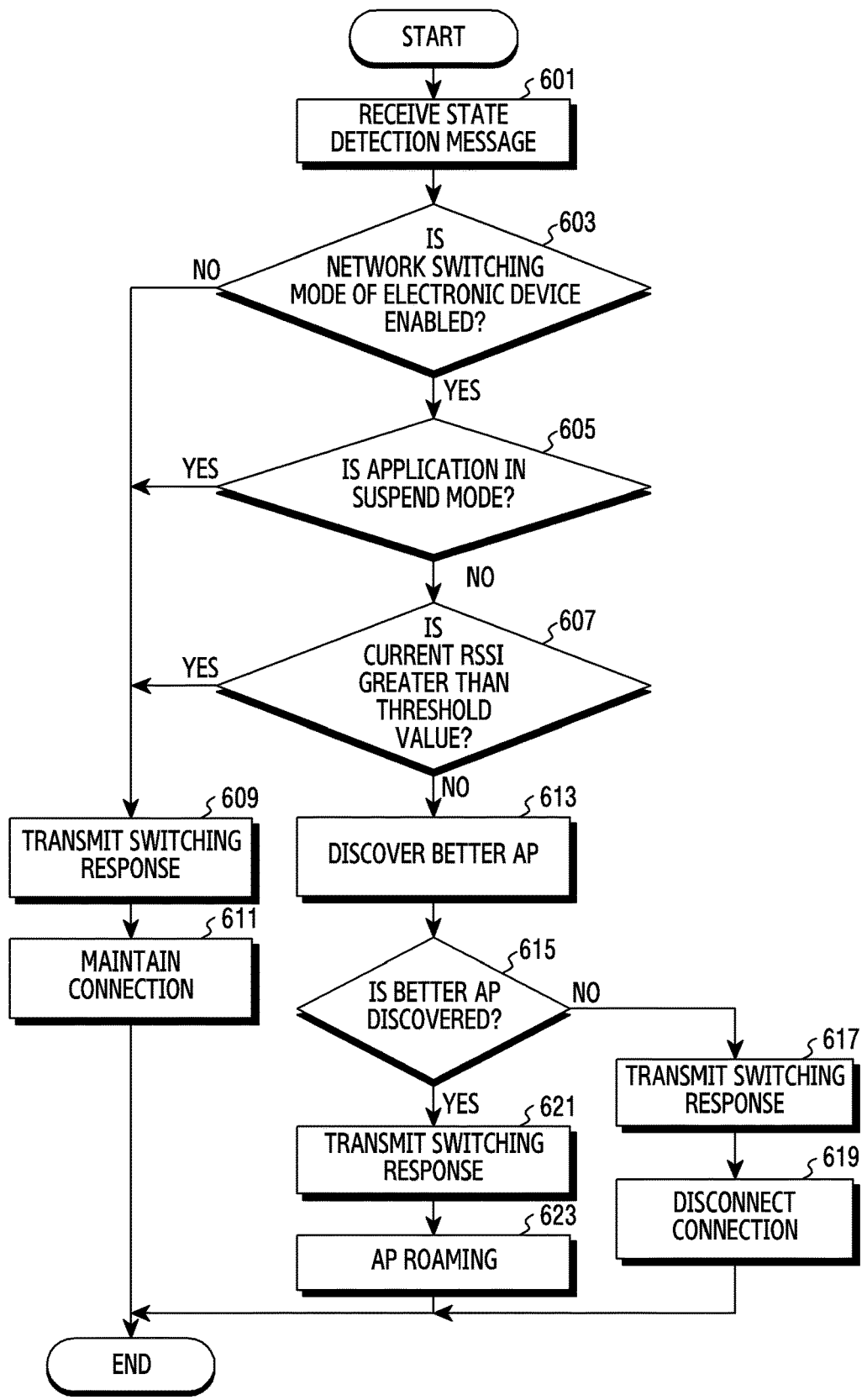
FIG. 6 illustrates a flowchart for a communication state detection operation of an electronic device according to an embodiment of the disclosure.

FIG. 6 is a flowchart illustrating an internal state detection operation of an electronic device 101 according to an embodiment of the disclosure.

According to an embodiment, in operation 601, the electronic device 101 may receive a state detection message from an access point (for example, the access point 210 of FIG. 2).

According to an embodiment, in operation 603, the electronic device 101 may determine whether a network switching mode of the electronic device 101 is enabled.

The network switching mode may refer to a mode in which a communication interface of the electronic device 101 can switch from Wi-Fi communication to cellular communication based on a communication state and/or a state of the electronic device 101. For example, when the network switching mode is enabled and a pre-set criterion is satisfied, the electronic device 101 may switch the communication interface by itself even if a user does not perform an additional input for switching the communication interface.

The network switching mode being disabled may be understood as meaning that the communication interface is switched from Wi-Fi communication to cellular communication or from cellular communication to Wi-Fi communication only by user's selection. For example, when the network switching mode is disabled, the user may enable only one of cellular communication or Wi-Fi communication of the electronic device 101 or may terminate communication for all communication interfaces. However, since it is assumed that the electronic device 101 is currently connected with the current access point 210, it may be understood that the cellular communication of the electronic device 101 is disabled. In another example, the network switching mode may refer to a mode in which, even when the cellular communication is enabled, user's approval is required so that switching from Wi-Fi communication to cellular communication is not automatic. In this case, the electronic device 101 may output a pop-up message inquiring of the user about whether to switch from Wi-Fi communication to cellular communication to a display (for example, the display module 160 of FIG. 1) of the electronic device 101.

In an embodiment, when a switching request is received in a state where the network switching mode is disabled, the electronic device 101 may not disconnect the current connection. For example, when it is identified that the position of the electronic device 101 is out of the service region of the currently connected access point 210, but the electronic device 101 receiving the switching request determines that the network switching mode is disabled, the electronic device 101 may maintain the connection with the access point 210 currently connected therewith in operation 611. In this case, the electronic device 101 may transmit information indicating that the network switching mode is disabled to the current access point 210. The transmitted information may be transmitted in the form of a switching response message or may be included in the switching response message.

According to an embodiment, the electronic device 101 may transmit information regarding whether the network switching mode is supported to the access point 201. For example, the electronic device 101 may transmit the information regarding whether the electronic device 101 supports the network switching mode to the access point 210 during an operation of connecting the Wi-Fi network with the access point 210 or after connecting the Wi-Fi network. When it is determined that the electronic device 101 does not support the network switching mode, the access point 201 may not transmit the state detection message to the electronic device 101.

According to an embodiment, the electronic device 101 may transmit information regarding whether the network switching mode is enabled or disabled to the access point 201. For example, when the network switching mode is enabled or disabled, the electronic device 101 may transmit information regarding whether the network switching mode is enabled or disabled to the access point 210. When the electronic device 101 determines that the network switching mode is disabled, the access point 201 may not transmit the state detection message to the electronic device 101.

When it is determined that the network switching mode is enabled, the electronic device 101 may proceed to operation 605.

According to an embodiment, in operation 605, the electronic device 101 may determine whether an application is in sleep mode. The sleep mode may refer to a temporary idle state or a mode in which the application in the electronic device 101 is not executing. The application being in the sleep mode may be understood as meaning that the processor for executing the application is also in the sleep mode. Herein, the application may refer to an application that is executed to transmit and receive data to and from the currently connected access point 210, or an application associated therewith. When the application is not executing, it may be determined that there is no substantial data exchange between the electronic device 101 and the access point 210, and there is less need to switch the communication interface to continuously transmit and receive data. Accordingly, when the application is in sleep mode, there may be less need to disconnect the connection with the currently connected access point 210 and to discover a new access point 210. Accordingly, when the application is in the sleep mode, the electronic device 101 may determine to maintain the current connection, and in operation 609, the electronic device 101 may transmit information regarding whether the application in the electronic device 101 is in the sleep mode to the currently connected access point 210, through the switching response message. The electronic device having performed operation 609 may maintain the connection with the currently connected access point 210 in operation 611.

When it is determined that the application of the electronic device 101 is not in the sleep mode, the electronic device 101 may perform operation 607.

According to an embodiment, in operation 607, the electronic device 101 may identify whether a current RSSI is greater than a threshold value.

For example, the RSSI may refer to a received signal strength, and may be a criterion for determining quality of the communication connection with the access point 210 which is currently connected with the electronic device 101.

The current RSSI may be refer to the connection quality when data is transmitted and received in the relationship with the currently connected access point 210. When a high RSSI is measured, it may be estimated that the electronic device 101 can perform smooth wireless communication with the access point 210 currently connected therewith. For example, when the current RSSI identified by the electronic device 101 is higher than a designated threshold value, it may be understood that the electronic device 101 is positioned within the service region of the currently connected access point 210. In another example, when the current RSSI identified by the electronic device 101 is higher than the designated threshold value, it may be estimated that there is low possibility that the electronic device 101 will move out of the service region such that quality of the connection with the access point 210 is degraded. Herein, the designated threshold value may be understood as a minimum signal strength that is required for the electronic device 101 to smoothly perform wireless communication with the access point 210 currently connected therewith. The threshold value may be determined according to selection of the user or based on information provided by another entity, taking into consideration the type of the access point 210, the surrounding environment of the electronic device 101 and/or the access point 210, and/or interference by another electronic device (for example, the electronic device 102 of FIG. 1) existing in the service region. In an embodiment, when it is identified that the designated threshold value is higher than a currently measured RSSI, the electronic device 101 may estimate that it is difficult to smoothly perform wireless communication with the currently connected access point 210. For example, it may be determined that the electronic device 101 is out of the service region of the current access point 210. Accordingly, the electronic device 101 may proceed to operation 613 to discover another neighboring access point. However, when the current RSSI is higher than the threshold value, it may be estimated that the electronic device 101 exists within the service region of the currently connected access point 210, and may not have to disconnect the current connection or perform roaming to another access point. Accordingly, in this case, in operation 609, the electronic device 101 may transmit information identifying that the current RSSI is higher than the threshold value to the currently connected access point 210. In this case, the corresponding information may be transmitted in the form of a switching response message or may be included in the switching response message. The electronic device 101 which has performed operation 609 may maintain the connection with the currently connected access point in operation 611.

The flowchart of FIG. 6 does not limit the sequence of operation 603, operation 605, and operation 607, and at least one of these operations may be performed in a different order as shown in FIG. 6 or two or more operations may be performed simultaneously. In other embodiments of the disclosure, a subsequent operation may be performed based on information determined in these operations.

According to an embodiment, in operation 613, the electronic device 101 may perform an operation of identifying whether there exists another access point that provides Wi-Fi network, in addition to the currently connected access point 210. For example, the electronic device 101 may identify the number of other neighboring access points, positions, identification information and/or signal strength by performing a process of discovering around the electronic device 101 (for example, an operation of scanning).

According to an embodiment, in operation 615, the electronic device 101 may identify whether another connectable access point is discovered. Another connectable access point may refer to an access point that satisfies a pre-set condition regarding communication quality. Whether the pre-set condition is satisfied may be understood as whether a strength of a signal received from another access point is greater than or equal to a threshold value, whether the access point is connectable with the electronic device by higher than predetermined communication quality, and/or whether roaming is possible.

For example, the connectable access point may refer to another access point that provides better connection quality than the access point 210 currently connected with the electronic device 101. In addition, since it is identified that the current RSSI of the electronic device 101 is smaller than the threshold value, it may be estimated that the current position of the electronic device 101 is in a service region of an access point other than the currently connected access point 210. Accordingly, operations 613 to 615 may be understood as a process of discovering another access point having a service region that includes the current position of the electronic device 101. When the electronic device 101 discovers a plurality of other access points having service regions including the current position of the electronic device 101, the electronic device 101 may determine one of the other access points that has the best communication quality as a connectable access point. Herein, one access point having the best communication quality may refer to an access point in which a highest RSSI value is measured.

When the connectable access point is discovered, operation 621 may be performed. When the connectable access point is not discovered, operation 617 may be performed.

According to an embodiment, in operation 617, the electronic device 101 may transmit a switching response message to the access point 210.

The switching response message transmitted by the electronic device 101 to the access point 210 in operation 617 may include information indicating that the network switching mode of the electronic device 101 is enabled, the application is not in the sleep mode, and the current RSSI is smaller than the threshold value. In addition, the switching response message may include information indicating that a connectable access point is not found as a result of discovering another access point. For example, the switching response message may include information indicating that the electronic device 101 is disconnecting the connection with the access point 210 and is switching to cellular communication. The switching response message transmitted by the electronic device 101 in operation 617 may be transmitted to the access point 210 which is currently connected with the electronic device 101. The access point 210 which is currently connected with the electronic device 101 may be informed that the electronic device 101 switches the communication interface to cellular communication, by receiving the switching response message transmitted by the electronic device 101 in operation 617.

In operation 619, the electronic device 101 may disconnect the connection with the access point 210 currently connected therewith.

In the next operation, the electronic device 101 may start switching the communication interface to cellular communication.

According to an embodiment, in operation 621, the electronic device 101 may transmit a switching response message to the access point 210.

For example, the switching response message transmitted by the electronic device 101 in operation 621 may include information indicating that the network switching mode of the electronic device 101 is enabled, the application is not in the sleep mode, and the current RSSI is smaller than the threshold value. In addition, the switching response message may include information indicating that a connectable access point is found as a result of discovering another access point. The switching response message may be transmitted to the access point 210 which is currently connected with the electronic device 101.

According to an embodiment, in operation 623, the electronic device 101 may perform roaming to the connectable access point. In this case, the communication interface may not be switched. The access point 210 which is currently connected with the electronic device 101 may find that the electronic device 101 performs roaming to the connectable access point from the access point 210, by receiving the switching response message transmitted by the electronic device 101 in operation 621.

Figure 7:
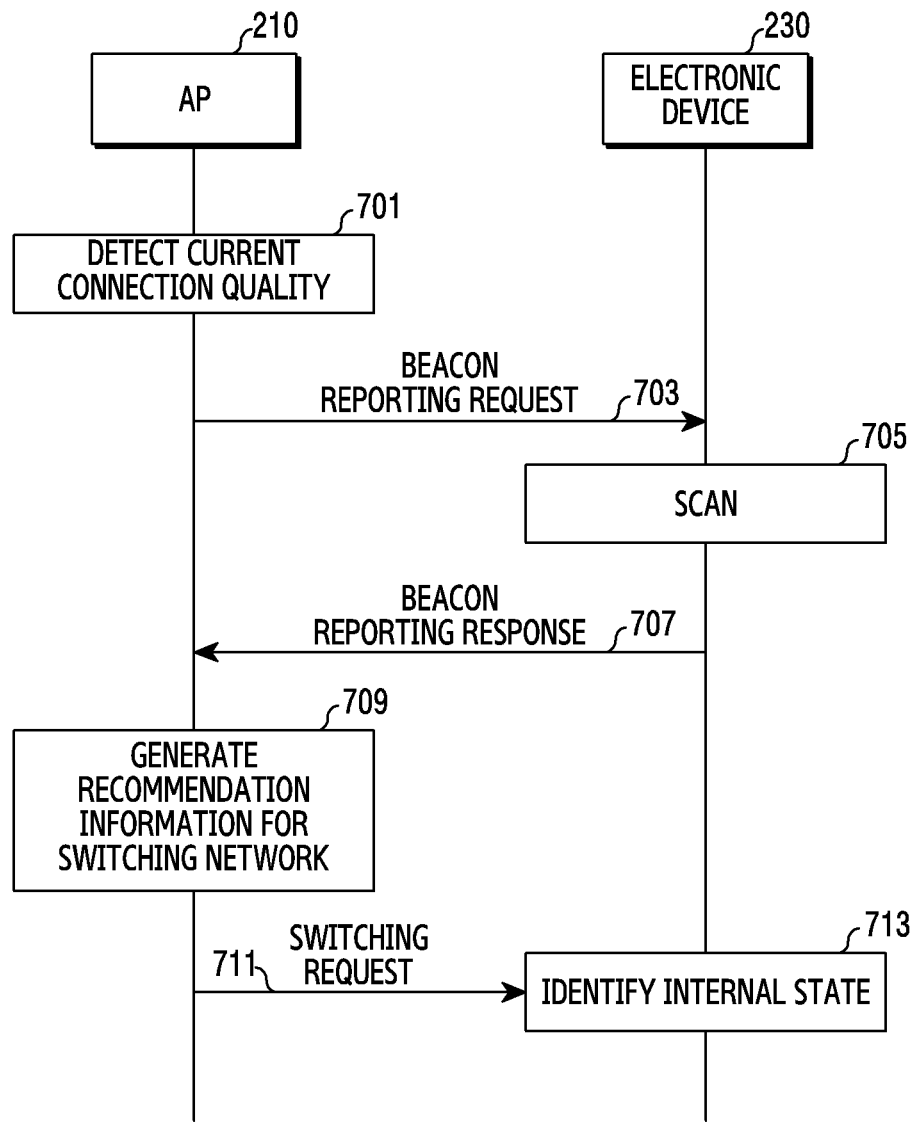
FIG. 7 illustrates a process of an access point for starting an operation of identifying a communication state of an electronic device in a wireless communication system according to an embodiment of the disclosure.

FIG. 7 illustrates a process of an electronic device 230 for starting an operation of identifying an internal state of the electronic device 230 based on information received from an access point 210 in a wireless communication system according to an embodiment of the disclosure.

Referring to FIG. 7, the electronic device 230 (for example, the electronic device 101 of FIG. 1 or the electronic device 300 of FIG. 3) may receive a message for triggering identification of an internal state of the electronic device 230 from the access point 210.

According to an embodiment, in operation 701, the access point 210 may detect quality of the wireless communication connection with the electronic device 230 which is currently connected therewith. Since the access point 210 provides a defined service region, the access point 210 may be connected with at least one electronic device (for example, the electronic device 230) existing within the service region. In this case, the access point 210 may perform an operation of detecting quality of the communication connection of an individual electronic device (for example, the electronic device 230). The process of detecting the communication connection quality may be periodically performed and may be performed by exchanging signals with the electronic device 230. The access point 210 may intermittently or periodically perform the process of detecting quality of the communication connection with the electronic device 230 which is currently connected therewith or the electronic device 230 identified as existing in the service region.

According to an embodiment, in operation 703, the electronic device 230 may receive a beacon reporting request from the access point. For example, the access point 210 may detect quality of the communication connection with at least one electronic device, and, when the access point 210 determines that the communication connection quality is not good with a specific electronic device (for example, the electronic device 230), the corresponding electronic device (for example, the electronic device 230) may receive a beacon reporting request from the access point. For example, the access point 210 may determine that the communication connection quality is not good, based on a pre-defined threshold value.

According to an embodiment, the access point 210 may transmit the beacon reporting request to the electronic device 230 and may acquire information regarding other access points on the periphery of the electronic device 230. For example, the beacon reporting request may include a specific SSID. The specific SSID may be the SSID of the access point 210 which is currently connected with the electronic device 230, or an SSID of another access point existing within a predetermined region with reference to a current position of the electronic device 230. According to an embodiment, the access point 210 may receive a beacon message transmitted by another neighboring access point, and may transmit the beacon reporting request including an SSID included in the received beacon message to the electronic device 230.

According to an embodiment, in operation 705, the electronic device 230 may perform scanning. For example, the electronic device 230 may perform discovering in response to the beacon reporting request being received from the access point 210. According to an embodiment, discovering performed by the electronic device (for example, scanning) may be an operation of identifying whether there exists another access point on the periphery of the electronic device 230, identifying identification information of another neighboring access point, or identifying information regarding whether the electronic device 230 belongs to a service region of another access point. According to another embodiment, by performing the discovering or scanning, the electronic device 230 may identify the relative position between the electronic device 230 and the access point 210, based on whether the electronic device 230 is relatively far away from the access point 210 currently connected therewith or whether the electronic device 230 approaches the boundary of the service region.

According to an embodiment, in operation 707, the electronic device 230 may transmit a beacon reporting response to the access point 210. For example, in response to discovering being performed, the electronic device 230 may transmit the beacon reporting response to the access point 210 which is currently connected therewith. In this case, the beacon reporting response may be transmitted in the form of a message, and information identified by the electronic device 230 through discovering (for example, the number of other neighboring access points, positions, identification information and/or a signal strength) may be included in the beacon reporting response message. The access point 210 may receive the beacon reporting response message transmitted from the electronic device 230.

According to an embodiment, in operation 709, the access point 210 may generate network switching recommendation information. For example, the access point 210 may determine whether the electronic device 230 should switch the communication interface to cellular communication, in response to the beacon reporting response message being received from the electronic device 230. The access point 210 may analyze the beacon reporting response message received from the electronic device 230, and may determine whether there exists another access point that is connectable by the electronic device 230, based on information regarding other access points existing on the periphery of the electronic device 230, and, when there does not exist another connectable access point, may determine whether the electronic device 230 should switch to cellular communication. When the access point 210 determines whether the electronic device 230 switches the communication interface or whether roaming to another access point is performed, the access point 210 may generate recommendation information based on the result of determining.

According to an embodiment, in operation 711, the electronic device 230 may receive a switching request message from the access point 210. The switching request message may include the recommendation information generated by the access point 210. The switching request message may be referred to as a state detection message or may perform a similar function to the state detection message. In addition, the switching request message may include information regarding whether there does not exist a neighboring access point 210 on the periphery of the electronic device 230, whether the neighboring access point does not provide a sufficient wireless communication service to the electronic device 230 although there exists a neighboring access point 210, and may include information regarding RSSIs of other access points. The electronic device 230 which receives the switching request message may determine whether to switch the communication interface to cellular communication or whether to perform roaming to another access point, by referring to the corresponding recommendation information. According to an embodiment, the electronic device 230 may determine whether to maintain or disconnect the connection with the access point 210 currently connected therewith. For example, since the recommendation information is determined and generated by the access point 210, the electronic device 230 may determine whether to switch or to perform roaming, by referring to the recommendation information. According to another embodiment, the electronic device 230 may identify an internal state regardless of the determination by the access point 210, and may determine whether to switch or to perform roaming by itself, based on information determined based on the internal state. For example, the electronic device 230 may also determine whether to disconnect the connection with the access point 210 currently connected therewith, according to internal information identified by the electronic device 230.

According to an embodiment, in operation 713, the electronic device 230 may identify a communication state. For example, the electronic device 230 may identify the communication state of the electronic device 230 in response to the switching request message being received from the access point 210. Herein, the communication state may refer to an internal state of the electronic device 230. The operation of identifying the internal state of the electronic device 230 may be understood as an operation of identifying an RSSI value regarding a communication connection in the relationship with the access point 210 currently connected therewith, an operation of identifying whether a network switching mode of the electronic device 230 is enabled, an operation of identifying whether an application associated in performing a communication connection with the access point 210 currently connected with the electronic device 230 is in a sleep mode. In addition, the internal state may include information regarding whether data is currently used by the user and data usage, user preference, a cellular data plan, mobility information of the electronic device, and/or a value of a result of comparing a Wi-Fi parameter and a cellular parameter.

Figure 8:
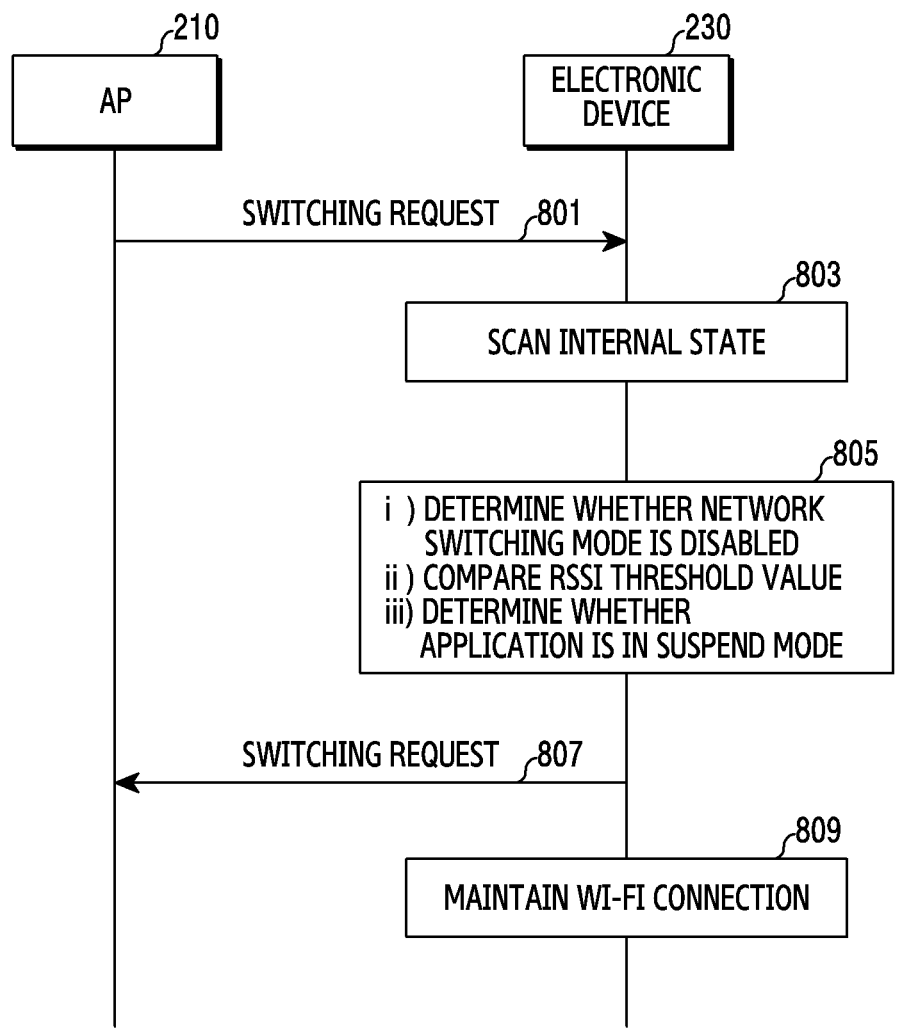
FIG. 8 illustrates operations related to the identification of the communication state of the electronic device in the wireless communication system according to an embodiment of the disclosure.

FIG. 8 illustrates operations related to identification of an internal state of the electronic device 230 in the wireless communication system according to an embodiment of the disclosure.

According to an embodiment, the electronic device 230 may identify an internal state in response to a switching request message being received from the access point 210 (801). In operation 801, the electronic device 230 may perform the operation of identifying the internal state (803). According to another embodiment, the electronic device 230 may periodically or intermittently (for example, in the case of transmitting and receiving data) scan a communication state. For example, after identifying the communication state or internal state, the electronic device 230 may receive the switching request message from the access point 210. According to an embodiment, in operation 805, the electronic device 230 may perform a process of identifying whether at least one of the conditions described below is satisfied.

According to an embodiment, it may be identified whether a network switching mode of the electronic device 230 is disabled. The network switching mode may refer to a mode in which the communication network can be switched from Wi-Fi communication to cellular communication. For example, the network switching mode may be understood as a mode in which the electronic device 230 can change the communication interface, which is a means for connecting to a network to use communication service provided in the wireless communication system, based on state information of the electronic device 230. The state information may refer to information regarding an internal state of the electronic device 230. The internal state may include information regarding whether data is currently used by the user and data usage, user preference, a cellular data plan, mobility information of the electronic device, and/or a value of a result of comparing a Wi-Fi parameter and a cellular parameter. According to certain embodiments, the network switching mode may be understood as including not only switching from Wi-Fi communication to cellular communication, but also switching from cellular communication to Wi-Fi communication. When the network switching mode is disabled, switching of the communication interface may not be performed automatically according to an internal state of the electronic device 230 or external factors or according to pre-set rules, but may be performed only by user's selection or command. According to an embodiment, when the network switching mode is enabled, it may be possible to set the communication interface to be switched automatically according to a change in the RSSI value, and/or the type or size of content transmitted or received by the electronic device 230. According to another embodiment, in the state where the network switching mode is disabled, even when the electronic device 230 goes farther away from the access point 210 currently connected therewith due to movement of the user carrying the electronic device 230, the communication interface may not be switched to cellular communication. However, in this case, a message for inquiring of the user about whether to switch to cellular communication or whether to maintain current Wi-Fi communication may be outputted to an output unit such as a display (for example, the display module 160 of FIG. 1). When a user input on the corresponding message is detected by the electronic device 230, the input may be recognized as user's selection and switching to a corresponding communication interface may be performed.

According to an embodiment, the access point 210 may transmit, to the electronic device 230, the switching request message to allow the electronic device 230 to check its state, to determine whether to perform roaming to a connectable access point based on a result of checking the state, whether to switch the communication interface to cellular communication, or whether to maintain the current connection. According to an embodiment, in the state where the network switching mode is disabled, even when pre-defined conditions are satisfied, the electronic device 230 may not switch the communication interface without user's selection. Therefore, the electronic device 230 may first identify whether the network switching mode is disabled. However, the instant disclosure is not so limited and the identification of whether the network switching mode is disabled may not be performed first.

According to an embodiment, the electronic device 230 may detect an RSSI value in the relationship with the access point 210 currently connected therewith. The RSSI value may refer to a received signal strength, and, when the RSSI value is greater than or equal to a predetermined value, a wireless communication service between the electronic device 230 and the access point 210 may be smoothly provided. A threshold value for serving as a reference for the smooth wireless communication service may be pre-defined. This may be referred to as an RSSI threshold value. The RSSI threshold value may be a value that is already inputted by the user, and may be periodically or intermittently updated through an external server. The RSSI threshold value may vary according to at least one of performance of the electronic device 230, performance of the access point 210, a characteristic of a service region occupied by the access point 210, and/or a surrounding environment of the electronic device 230 or the access point 210. The RSSI threshold value may be understood as a minimum RSSI value that is measured by the electronic device 230 to provide a smooth wireless communication service between the access point 210 and the electronic device 230. It may be normally expected that a value similar to the RSSI threshold value is measured from the electronic device 230 positioned on the outermost portion of the service region of the access point. However, as described above, the RSSI threshold value may vary according to a position of the service region, and information of the RSSI threshold value which is determined by considering all factors may be already transmitted to the electronic device 230. The RSSI value may vary according to the distance between the electronic device 230 and the access point 210 even within the service region. The RSSI value information may be continuously updated by exchanging signals with the access point 210. The electronic device 230 may compare the already known RSSI threshold value and an RSSI value measured through the internal state identification process. When it is determined that the measured RSSI value is greater than the RSSI threshold value through the above-described comparing process, the electronic device 230 may maintain the connection with the access point 210 currently connected therewith. This is because measurement of the RSSI greater than or equal to the RSSI threshold value means that a smooth wireless communication service can be performed between the electronic device 230 and the access point 210, and it is not necessary to determine whether to disconnect the connection with the currently connected access point 210 or whether to perform roaming with another access point.

According to an embodiment, the electronic device 230 may determine whether an application is in sleep mode. The application may refer to an application that is associated with transmission and reception of data in a state where the access point 210 currently connected with the electronic device 230. For example, when the electronic device 230 uses a media streaming service through the access point 210, the application may correspond to an application or a program that is executed by the electronic device 230 to provide the corresponding media streaming service. The sleep mode may refer to a mode that is set to be switched to a low-power mode when the application is not used, and to manage resources efficiently. The application being in the sleep mode may be understood as the processor for executing the corresponding application being in the sleep mode. In this case, it may be understood that data transmission and reception between the access point 210 and the electronic device 230 is not temporarily performed. In the case of the sleep mode in which data transmission is not performed between the electronic device 230 and the access point 210, it may not be necessary to determine whether to disconnect the connection between the electronic device 230 and the access point 210 or whether to maintain the connection. In addition, it may not be necessary to discover a connectable access point other than the access point 210 currently connected with the electronic device 230. The reason to discover another access point or to determine whether to disconnect the connection with the current access point 210 and whether to switch to cellular communication is that a delay that the user feels can be minimized by providing a continuous wireless communication service to the electronic device 230. Therefore, when the user does not substantially perform wireless communication, the above-described process may not need to be performed. According to an embodiment, when the electronic device 230 determines that the application is in the sleep mode, the electronic device 230 may determine to maintain the current connection.

The electronic device 230 may determine whether the above-described conditions are satisfied through the process of identifying the internal state. When the electronic device 230 determines that at least one of the above-described conditions (for example, the condition where the network switching mode is disabled, the condition where the measured RSSI value is greater than or equal to the RSSI threshold value, and/or the condition where the application is in the sleep mode) is satisfied, the electronic device 230 may maintain the connection with the access point 210 currently connected therewith. That is, the electronic device 230 may not disconnect the connection with the access point 210 currently connected therewith.

According to certain embodiments, when the electronic device 230 determines that the network switching mode of the electronic device 230 is disabled, that the RSSI value is greater than the pre-set threshold RSSI value in the relationship with the access point 210 currently connected with the electronic device 230, and/or that the application related to the communication service provided by the access point 210 is in the sleep mode, the electronic device 230 may maintain the connection with the access point 210 currently connected with the electronic device 230.

According to an embodiment, in operation 807, the electronic device 230 may transmit a switching response message to the access point 210. For example, the electronic device 230 may identify the internal state of the electronic device 230, and, when it is determined whether the application is in the sleep mode, whether the network switching mode is disabled, or whether the RSSI value exceeds the threshold value, the electronic device 230 may transmit a switching response message to the access point 210 currently connected therewith. In addition, the operation of transmitting the switching response message may be performed based on information regarding whether data is currently used by the user and data usage, user preference, a cellular data plan, mobility information of the electronic device, and/or a value of a result of comparing a Wi-Fi parameter and a cellular parameter.

The switching response message may include information identified through identification of the internal state. For example, the electronic device 230 may include, in the switching response message, information regarding whether the network switching mode of the electronic device 230 is disabled, whether the RSSI value is greater than the pre-set threshold RSSI value in the relationship with the access point 210 currently connected with the electronic device 230, and/or whether the application related to the communication service provided from the access point 210 is in the sleep mode, and may transmit the switching response message to the access point 210.

According to an embodiment, in operation 809, the electronic device 230 may determine to maintain Wi-Fi connection. For example, when the RSSI value is greater than the pre-set threshold RSSI value, the application related to the communication service provided by the access point 210 is in the sleep mode, and/or the network switching mode is disabled, the electronic device 230 may maintain the Wi-Fi connection with the access point 210 currently connected therewith.

Figure 9:
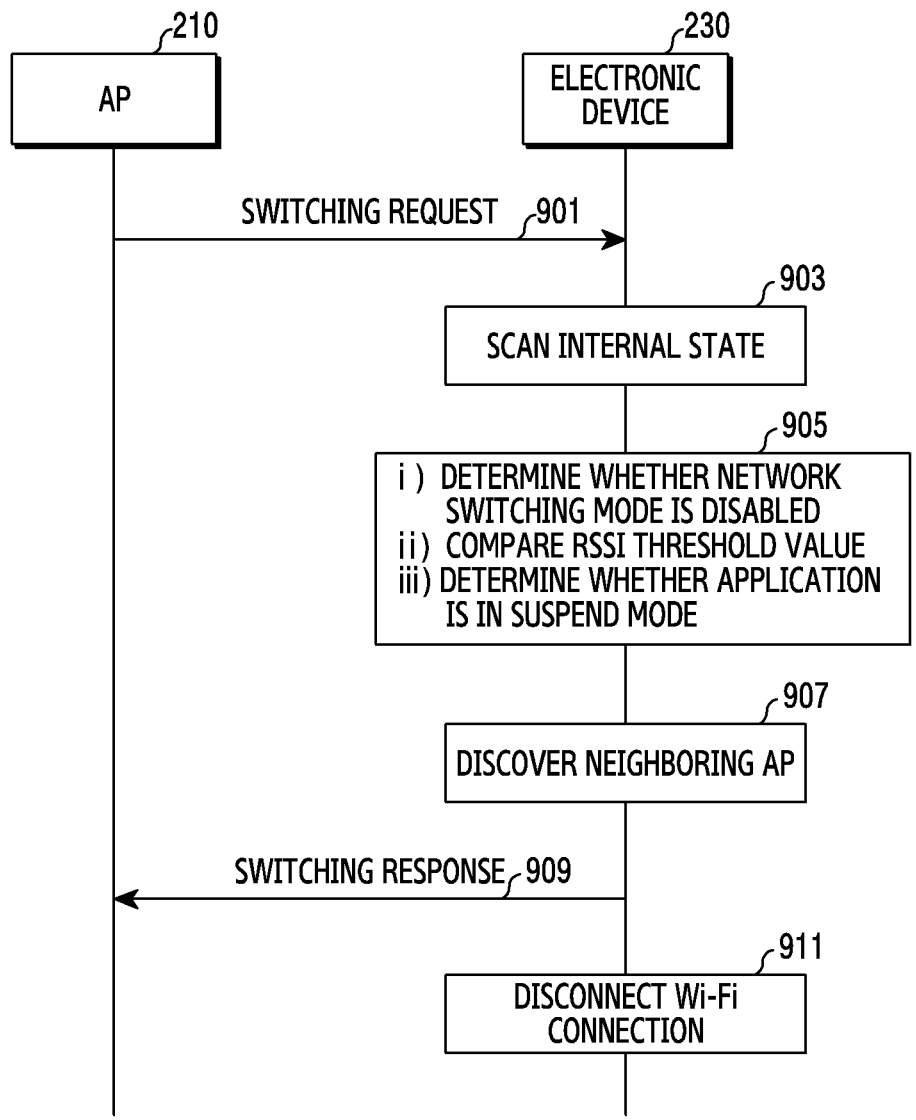
FIG. 9 illustrates operations related to the identification of the communication state of the electronic device in the wireless communication system according to another embodiment of the disclosure.

FIG. 9 illustrates operations related to the identification of the internal state of the electronic device 230 in the wireless communication system according to another embodiment of the disclosure.

According to an embodiment, in operation 903, the electronic device 230 may scan a communication state. For example, the electronic device 230 may identify a communication state or an internal state in response to a switching request message being received from the access point 210 (901). According to another embodiment, the electronic device 230 may periodically or intermittently (for example, in the case of transmitting and receiving data) scan the communication state. For example, the electronic device 230 may identify the communication state or the internal state, and then, may receive the switching request message from the access point 210.

According to an embodiment, in operation 905, the electronic device 230 may identify the communication state. The process of identifying the internal state may include a process of the electronic device 230 for identifying whether the three following conditions are all satisfied:
 i) whether a network switching mode of the electronic device 230 is enabled.
 ii) whether an RSSI value is smaller than a pre-defined threshold RSSI value.
 iii) whether an application is not in sleep mode.

According to an embodiment, in operation 907, the electronic device 230 may discover neighboring access points. For example, the electronic device 230 may identify the internal state of the electronic device 230, and may perform the process of discovering other neighboring access points only when the above-described three conditions are all satisfied. Other neighboring access points may refer to access points other than the access point 210 currently connected with the electronic device 230. Herein, the electronic device 230 may identify whether another access point found through discovering is better than the access point 210 currently connected with the electronic device 230. Whether another access point is better than the access point 210 may be determined with reference to quality of a wireless communication connection between the access point 210 and the electronic device 230. According to an embodiment, when an RSSI value of the electronic device 230 and another access point is higher than an RSSI value of the electronic device 230 and the current access point 210, another access point discovered may be regarded as being better than the current access point 210. According to another embodiment, when the RSSI value on the connection between another access point and the electronic device 230 is higher than the pre-defined threshold RSSI value simultaneously, another access point discovered may be regarded as being better than the current access point 210. When another access point having the RSSI value exceeding all of the threshold RSSI value and the RSSI value of the current access point 210 is not found, the electronic device 230 may determine that there does not exist a connectable access point. When the electronic device 230 determines that there does not exist a connectable access point, the electronic device 230 may have difficulty in continuously receiving the wireless communication service through Wi-Fi communication, and thus may recognize that it is necessary to switch the communication interface to cellular.

According to an embodiment, in operation 909, the electronic device 230 may transmit a switching response to the access point 210. For example, the electronic device 230 may identify the internal state of the electronic device 230, and, when it is determined that the application is not in the sleep mode, that the network switching mode is enabled, and that the RSSI value is less than the threshold value, the electronic device 230 may transmit the switching response message to the access point 210 currently connected therewith. The switching response message may include information regarding whether all of the conditions are satisfied. Specifically, the electronic device 230 may include, in the switching response message, information regarding whether the network switching mode of the electronic device 230 is disabled, whether the RSSI value in the relationship with the access point 210 currently connected with the electronic device 230 is greater than the pre-set threshold RSSI value, whether the application related to the communication service provided from the access point 210 is in the sleep mode, and may transmit the switching response message to the access point 210. According to an embodiment, since the electronic device 230 does not find a connectable access point, the switching request message may further include information indicating that an access point better than the access point 210 currently connected with the electronic device 230 is not found on the periphery of the electronic device 230. According to another embodiment, when a connectable access point is not found, the electronic device 230 may perform operation 907 and may include information of other access points searched on the periphery of the electronic device 230 (for example, the number of other neighboring access points, positions, identification information and/or a signal strength) in the switching request message, and may transmit the switching request message.

According to an embodiment, in operation 911, the electronic device 230 may disconnect the Wi-Fi connection. For example, when a connectable access point is not found through discovering of neighboring access points, the electronic device 230 may disconnect the Wi-Fi connection with the access point 210 currently connected therewith in order to switch the communication interface to cellular communication.

Figure 10:
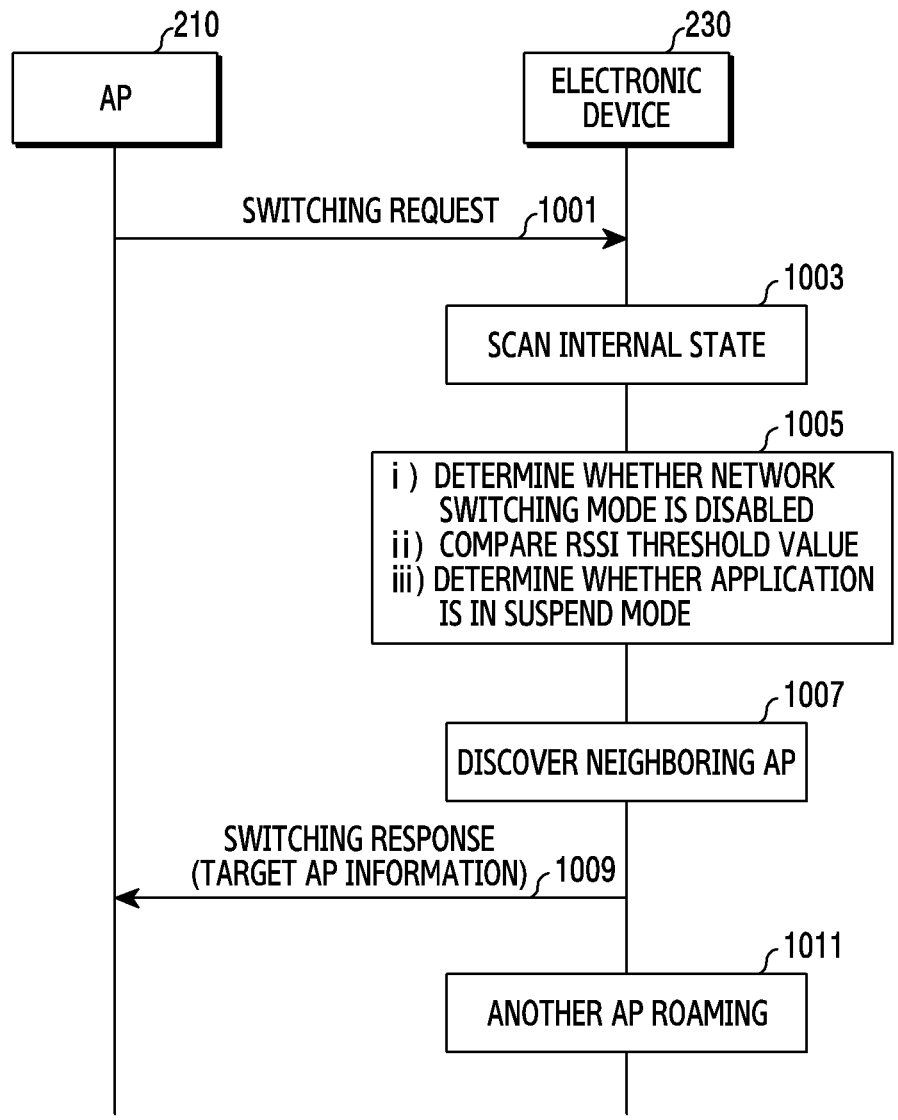
FIG. 10 illustrates operations related to the identification of the communication state of the electronic device in the wireless communication system according to still another embodiment of the disclosure.

FIG. 10 illustrates operations related to the identification of the internal state of the electronic device 230 in the wireless communication system according to still another embodiment of the disclosure.

According to an embodiment, in operation 1003, the electronic device 230 may scan a communication state. For example, the electronic device 230 may identify a communication state or an internal state in response to a switching request message being received from the access point 210 (1001). According to another embodiment, the electronic device 230 may periodically or intermittently (for example, in the case of transmitting and receiving data) scan the communication state. For example, the electronic device 230 may identify the communication state or the internal state, and then, may receive the switching request message from the access point 210.

According to an embodiment, in operation 1005, the electronic device 230 may identify the communication state. For example, the electronic device 230 may identify the internal state through scanning to identify the communication state. The process of identifying the internal state may include a process of the electronic device 230 identifying whether the three following conditions are all satisfied:
  i) whether a network switching mode of the electronic device 230 is enabled.
  ii) whether an RSSI value is smaller than a pre-defined threshold RSSI value.
  iii) whether an application is not in sleep mode.

According to an embodiment, in operation 1007, the electronic device 230 may discover neighboring access points. For example, the electronic device 230 may scan the internal state of the electronic device 230, and may perform the process of discovering other neighboring access points only when all of the above-described three conditions are satisfied. Other neighboring access points may refer to access points other than the access point 210 currently connected with the electronic device 230. According to an embodiment, the electronic device 230 may identify whether another access point found through discovering is better than the access point 210 currently connected with the electronic device 230. Whether another access point is better than the access point 210 may be determined with reference to quality of a wireless communication connection formed between the access point 210 and the electronic device 230. According to an embodiment, when an RSSI value of the electronic device 230 and another access point is higher than an RSSI value of the electronic device 230 and the current access point 210, another access point discovered may be regarded as being better than the current access point 210. According to another embodiment, when the RSSI value on the connection between another access point and the electronic device 230 is higher than the pre-defined threshold RSSI value simultaneously, another access point discovered may be regarded as being better than the current access point 210. According to an embodiment, when an access point 210 having an RSSI value exceeding all of the threshold RSSI value and the RSSI value of the current access point 210 is found, the electronic device 230 may determine to perform roaming to the corresponding access point 210. The connectable access point determined in this case may be referred to as a target access point.

According to an embodiment, in operation 1009, the electronic device 230 may transmit a switching response to the access point 210. For example, the electronic device 230 may identify the internal state of the electronic device 230, and, when it is determined whether the application is not in the sleep mode, whether the network switching mode is enabled, and whether the RSSI value is less than the threshold value, the electronic device 230 may transmit the switching response message to the access point 210 currently connected therewith. The switching response message may include information regarding whether all of the conditions are satisfied. For example, the electronic device 230 may include, in the switching response message, information regarding whether the network switching mode of the electronic device 230 is disabled, whether the RSSI value in the relationship with the access point 210 currently connected with the electronic device 230 is greater than the pre-set threshold RSSI value, and/or whether the application related to the communication service provided from the access point 210 is in the sleep mode, and may transmit the switching response message to the access point 210. According to an embodiment, when a connectable access point is found, the electronic device 230 may also transmit identification information of the target access point to the current access point 210.

According to an embodiment, in operation 1011, the electronic device 230 may perform a roaming procedure to the target access point 210. For example, the electronic device 230 may disconnect the communication connection with the access point 210 currently connected therewith, and may perform an operation of establishing a Wi-Fi communication connection with the target access point (for example, Wi-Fi roaming). In this case, the communication interface of the electronic device 230 may not be switched.

According to an embodiment of the disclosure, an operating method of an electronic device 300 in a wireless communication system may include: establishing a wireless communication connection for transmitting and receiving data to and from an access point 210 in a first communication method; receiving a state detection message from the access point 210; identifying an internal state of the electronic device 300 in response to the state detection message being received; and determining whether to switch a communication interface, based on the identified internal state, and the internal state may include at least one of a received signal strength indicator (RSSI) value of the wireless communication connection, information regarding whether a network switching mode of the electronic device 300 is enabled, information regarding whether an application related to the data is enabled, or information regarding use of the data.

According to an embodiment, identifying the internal state may further include comparing the RSSI value and a pre-defined threshold RSSI value.

According to an embodiment, the method may further include discovering other access points, based on the identified internal state.

According to an embodiment, at least one of the other access points may transmit, to the electronic device 300, a signal that has an RSSI value greater than the RSSI value of the wireless communication connection to the access point 210 and greater than the threshold RSSI value.

According to an embodiment, when the other access points are not discovered, the communication interface may be switched to a second communication method.

According to an embodiment, the first communication method may be related to a first performance parameter, the second communication method may be related to a second performance parameter, and switching the communication interface may be determined based on values of the first performance parameter and the second performance parameter.

According to an embodiment, the method may further include: acquiring position information of the electronic device 300, and determining whether to disconnect the wireless communication connection, based on the position information.

According to an embodiment, the method may further include transmitting information regarding whether the application is enabled and information regarding a result of comparing the values of the first performance parameter and the second performance parameter.

According to an embodiment, discovering the other access points may be performed when the application is enabled, the network switching mode of the electronic device is enabled, and the RSSI value is smaller than the threshold RSSI value.

According to an embodiment, the method may further include, when the other access points are not discovered, disconnecting the wireless communication connection in the first communication method with the access point 210.

According to an embodiment, an electronic device 300 in a wireless communication system may include: a communication unit 330; and at least one processor 310 electrically connected with the communication unit 330, and the at least one processor 310 may be configured to: establish a wireless communication connection for transmitting and receiving data to and from an access point 210 in a first communication method; receive a state detection message from the access point 210; identify an internal state of the electronic device 300 in response to the state detection message being received; and determine whether to switch a communication interface, based on the identified internal state, and the internal state may include at least one of a received signal strength indicator (RSSI) value of the wireless communication connection, information regarding whether a network switching mode of the electronic device is enabled, information regarding whether an application related to the data is enabled, or information regarding use of the data.

According to an embodiment, the at least one processor 310 may further be configured to compare the RSSI value and a pre-defined threshold RSSI value to identify the internal state.

According to an embodiment, the at least one processor 310 may further be configured to discover other access points, based on the identified internal state.

According to an embodiment, at least one of the other access points may transmit, to the electronic device 300, a signal that has an RSSI value greater than the RSSI value of the wireless communication connection to the access point 210 and greater than the threshold RSSI value.

According to an embodiment, the at least one processor 310 may further be configured to, when the other access points are not discovered, switch the communication interface to a second communication method.

According to an embodiment, the first communication method may be related to a first performance parameter, the second communication method may be related to a second performance parameter, and the at least one processor may further be configured to determine based on values of the first performance parameter and the second performance parameter to switch the communication interface.

According to an embodiment, the at least one processor 310 may further be configured to: acquire position information of the electronic device 300, and determine whether to disconnect the wireless communication connection, based on the position information.

According to an embodiment, the at least one processor 310 may further be configured to transmit information regarding whether the application is enabled and information regarding a result of comparing the values of the first performance parameter and the second performance parameter.

According to an embodiment, the at least one processor 310 may further be configured to discover the other access points when the application is enabled, the network switching mode of the electronic device is enabled, and the RSSI value is smaller than the threshold RSSI value.

According to an embodiment, the at least one processor 310 may further be configured to, when the other access points are not discovered, disconnect the wireless communication connection in the first communication method with the access point 210.

The apparatus and the method according to certain embodiments of the disclosure can reduce a delay experienced by the user by reducing time required to switch a communication network in a wireless communication system.

The effect achieved by the disclosure is not limited to those mentioned above, and other effects that are not mentioned above may be clearly understood to those skilled in the art based on the description provided above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to refer to similar or related elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in other components. According to an embodiment, one or more of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A method performed by an electronic device in a wireless communication system, the method comprising:
   establishing a wireless communication connection with a first access point supporting a first communication scheme;
   receiving, from the first access point, a request message for switching a communication scheme or an access point for transmitting and receiving signals;
   identifying whether an application processor of the electronic device is in a sleep mode based on the request message;
   performing a discovery procedure for a second access point supporting the first communication scheme, in case that the application processor is not in the sleep mode and a first received signal strength indicator (RSSI) value of first signals from the first access point is lower than a threshold;
   in case that the second access point is discovered via the discovery procedure, switching the access point from the first access point to the second access point;
   in case that the second access point is not discovered via the discovery procedure:
      identifying that a value of a first parameter associated with a performance of the first communication scheme is lower than a value of a second parameter associated with a performance of a second communication scheme; and
      switching the communication scheme from the first communication scheme to the second communication scheme.

2. The method of claim 1, further comprising:
identifying the first RSSI value of the first signals received from the first access point via the wireless communication connection; and
comparing the first RSSI value and the threshold.

3. The method of claim 2, further comprising:
transmitting, to the first access point, a response message including information on whether the application processor is in the sleep mode and information on a result of comparison between the first RSSI value and the threshold.

4. The method of claim 1, wherein second signals received from the second access point have a second RSSI value greater than the first RSSI value of the first signals and greater than the threshold.

5. The method of claim 1, further comprising:
acquiring position information of the electronic device; and
determining whether to disconnect the wireless communication connection, based on the position information.

6. The method of claim 1, wherein the discovery procedure is performed, in case that the application processor is not in the sleep mode, a network switching mode of the electronic device is enabled, and the first RSSI value is lower than the threshold.

7. The method of claim 6, further comprising:
in case that the second access point is not discovered, disconnecting the wireless communication connection associated with the first communication scheme; and
establishing a wireless communication connection associated with the second communication scheme with the first access point.

8. The method of claim 1, wherein the value of the first parameter is determined based on at least one of a communication performance of the first access point, or a location of the first access point, and
wherein the value of the second parameter is determined based on at least one of a communication performance of the second access point, or a location of the second access point.

9. The method of claim 1, wherein, in case that the application processor is in the sleep mode, the communication scheme corresponding to the first communication scheme is maintained.

10. An electronic device in a wireless communication system, the electronic device comprising: a transceiver; at least one processor electrically coupled with the transceiver and including an application processor; and memory storing instructions that, when executed by the at least one processor collectively or individually, cause the electronic device to: establish a wireless communication connection with a first access point supporting a first communication scheme, receive, from the first access point, a request message for switching a communication scheme or an access point for transmitting and receiving signals, identify whether the application processor is in a sleep mode based on the request message, perform a discovery procedure for a second access point supporting the first communication scheme, in case that the application processor is not in the sleep mode and a first received signal strength indicator (RSSI) value of first signals from the first access point is lower than a threshold, in case that the second access point scheme is discovered via the discovery procedure, switch the access point from the first access point to the second access point, in case that the second access point is not discovered via the discovery procedure: identify that a value of a first parameter associated with a performance of the first communication scheme is lower than a value of a second parameter associated with a performance of a second communication scheme, and switch the communication scheme from the first communication scheme to the second communication scheme.

11. The electronic device of claim 10, wherein the instructions, when executed by the at least one processor collectively or individually, cause the electronic device to: identify the first RSSI value of the first signals received from the first access point via the wireless communication connection, and compare the first RSSI value and the threshold.

12. The electronic device of claim 11, wherein the instructions, when executed by the at least one processor collectively or individually, cause the electronic device to:
transmit, to the first access point, a response message including information on whether the application processor is in the sleep mode and information on a result of comparison between the first RSSI value and the threshold.

13. The electronic device of claim 10, wherein second signals received from the second access point have a second RSSI value greater than the first RSSI value of the first signals and greater than the threshold.

14. The electronic device of claim 10, wherein the instructions, when executed by the at least one processor collectively or individually, cause the electronic device to:
acquire position information of the electronic device, and determine whether to disconnect the wireless communication connection, based on the position information.

15. The electronic device of claim 10, wherein the discovery procedure is performed, in case that the application processor is not in the sleep mode, a network switching mode of the electronic device is enabled, and the first RSSI value is lower than the threshold.

16. The electronic device of claim 15, wherein the instructions, when executed by the at least one processor collectively or individually, cause the electronic device to:
in case that the second access point is not discovered, disconnect the wireless communication connection associated with the first communication scheme, and
establish a wireless communication connection associated with the second communication scheme with the first access point.

17. The electronic device of claim 10, wherein the value of the first parameter is determined based on at least one of a communication performance of the first access point, or a location of the first access point, and
wherein the value of the second parameter is determined based on at least one of a communication performance of the second access point, or a location of the second access point.

18. The electronic device of claim 10, wherein the instructions, when executed by the at least one processor collectively or individually, cause the electronic device to: in case that the application processor is in the sleep mode, maintain the communication scheme corresponding to the first communication scheme.

* * * * *